United States Patent [19]

Hong

[11] Patent Number: 5,442,404
[45] Date of Patent: Aug. 15, 1995

[54] SCANNING LINE CONVERTING METHOD FOR A TELEVISION RECEIVER AND DEVICE THEREOF

[75] Inventor: Sung H. Hong, Seoul, Rep. of Korea

[73] Assignee: Goldstar Co., Ltd., Seoul, Rep. of Korea

[21] Appl. No.: 48,731

[22] Filed: Apr. 21, 1993

[30] Foreign Application Priority Data

Apr. 21, 1992 [KR] Rep. of Korea ............... 1992-6685

[51] Int. Cl.⁶ ............................................. H04N 7/01
[52] U.S. Cl. ...................................... 348/448; 348/452
[58] Field of Search .................. 348/448, 452, 447; H04N 7/01

[56] References Cited

U.S. PATENT DOCUMENTS

| | | | |
|---|---|---|---|
| 4,677,483 | 6/1987 | Dischert et al. | 348/448 |
| 4,941,045 | 7/1990 | Birch | 348/911 X |
| 4,947,251 | 8/1990 | Hentschel | 348/452 |
| 4,967,271 | 10/1990 | Campbell et al. | 348/448 |
| 4,985,764 | 1/1991 | Sato | 348/448 |
| 5,019,903 | 5/1991 | Dougall et al. | 348/448 |
| 5,046,164 | 9/1991 | Hurst, Jr. | 348/448 |
| 5,081,532 | 1/1992 | Rabii | 348/448 |
| 5,093,721 | 3/1992 | Rabii | 348/448 |
| 5,153,779 | 10/1992 | Ibenthal | 348/700 X |

*Primary Examiner*—Victor R. Kostak
*Attorney, Agent, or Firm*—Morgan & Finnegan

[57] ABSTRACT

The present invention relates to a scanning line converting method of television receiver for interpolating the scanning line by processing with two dimensional pseudomedian filtering, and which comprises: a step for setting a center value by peripheral pixel components of the pixels to be interpolated in a video signal of interlaced scanning system; a step for computing with a two dimentional pseudomedian filtering by center value and peripheral pixel components; a step for 2/1 time compressing respectively the computed signal and the video signal; and a step for selectively switching the 2/1 time compressed signals whereby interpolating the scanning line.

21 Claims, 21 Drawing Sheets

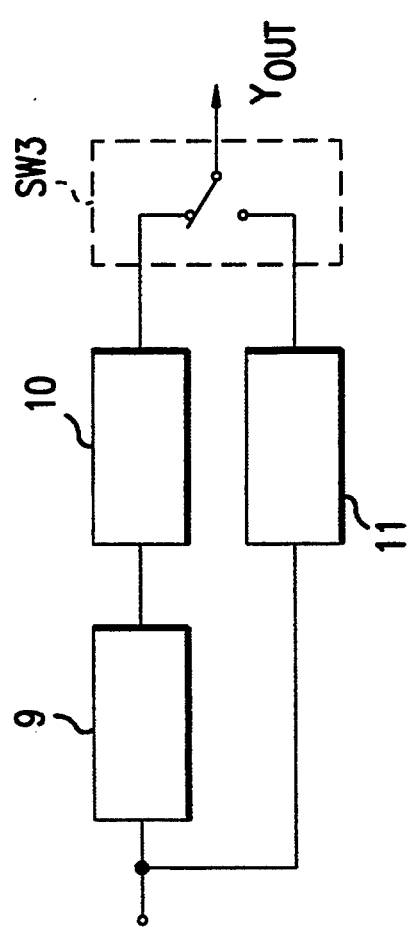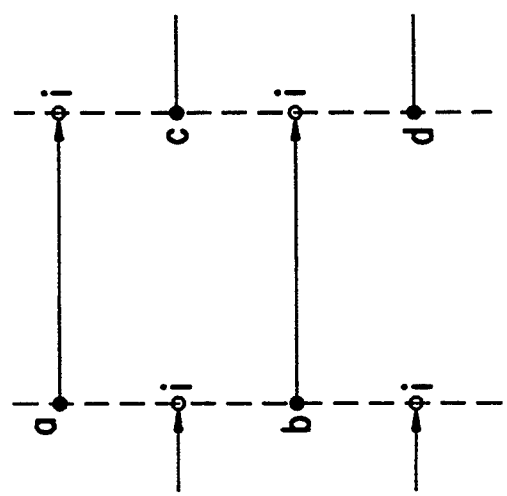

100 IRE
50 IRE
0 IRE

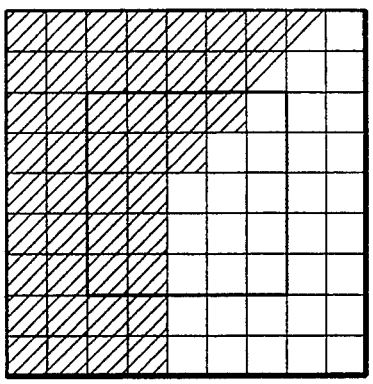 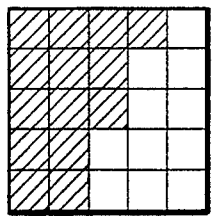 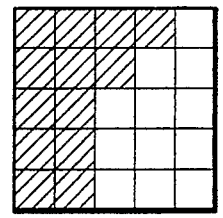
(MED)  (PMED)
FIG.6A
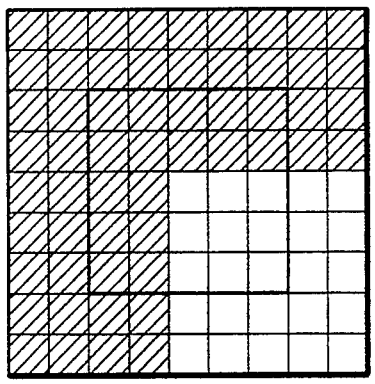 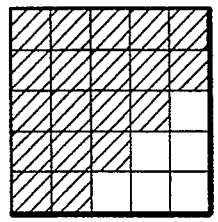 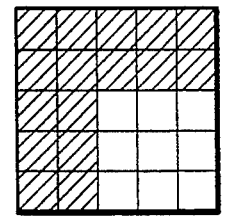
(MED)  (PMED)
▨ : 2  ☐ : 0  ▧ : 1
FIG.6B
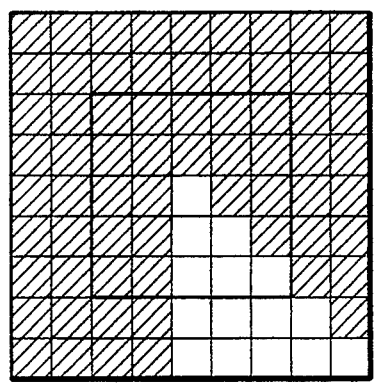 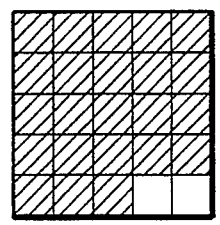 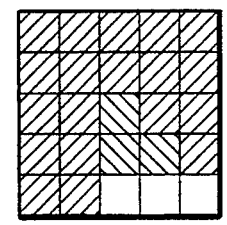
(MED)  (PMED)
FIG.6C

FIG.11A 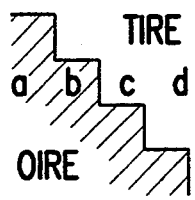

```
      ①D10②D11③D12④D13   Ho
a→ ① o  ② -T ③ o  ④ o    o
b→ ① -T ② o  ③ o  ④ o    T
c→ ① o  ② o  ③ o  ④ -T   T
d→ ① o  ② o  ③ -T ④ o    o
```

FIG.11B 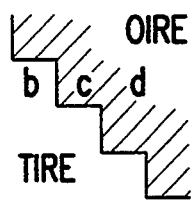

```
a→ ① o  ② T  ③ o  ④ o    o
b→ ① T  ② o  ③ o  ④ o   -T
c→ ① o  ② o  ③ o  ④ T   -T
d→ ① o  ② o  ③ T  ④ o    o
```

FIG.11C 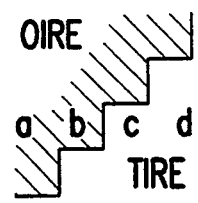

```
a→ ① o  ② o  ③ o  ④ -T   o
b→ ① o  ② o  ③ -T ④ o   -T
c→ ① o  ② -T ③ o  ④ o   -T
d→ ① -T ② o  ③ o  ④ o    o
```

FIG.11D 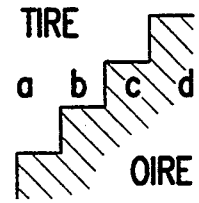

```
a→ ① o  ② o  ③ o  ④ T    o
b→ ① o  ② o  ③ T  ④ o    T
c→ ① o  ② T  ③ o  ④ o    T
d→ ① T  ② o  ③ o  ④ o    o
```

FIG.11E 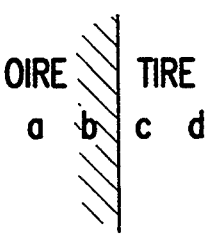

```
a→ ① o  ② o  ③ o  ④ o    o
b→ ① o  ② -T ③ o  ④ -T   o
c→ ① -T ② o  ③ -T ④ o    o
d→ ① o  ② o  ③ o  ④ o    o
```

FIG.11F 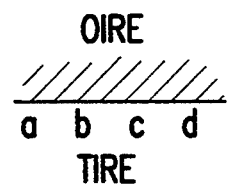

```
a→ ① o  ② o  ③ o  ④ o   -T
b→ ① o  ② o  ③ o  ④ o   -T
c→ ① o  ② o  ③ o  ④ o   -T
d→ ① o  ② o  ③ o  ④ o   -T
```

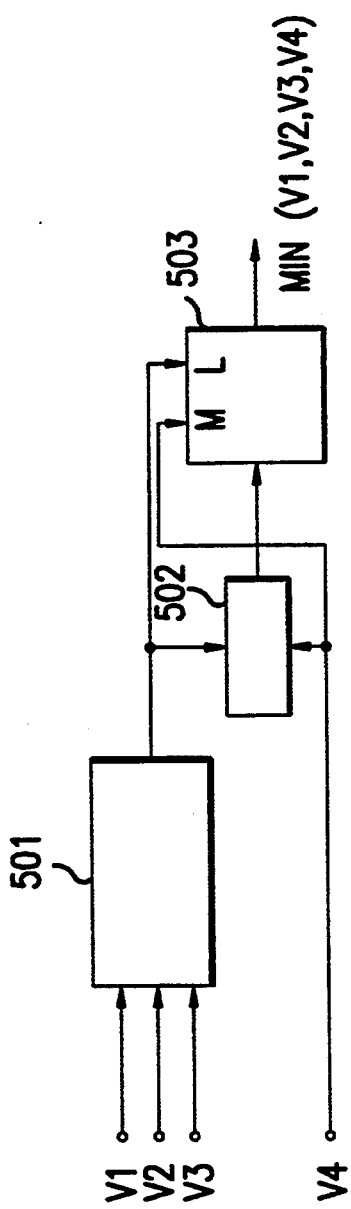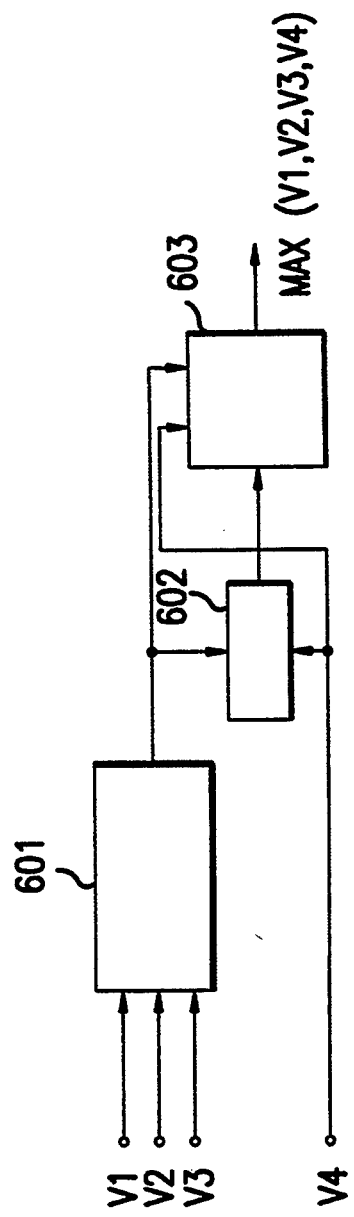

SCANNING LINE CONVERTING METHOD FOR A TELEVISION RECEIVER AND DEVICE THEREOF

FIELD OF THE INVENTION

Background of the Invention

The present invention relates to a method and device for converting a television signal of interlaced scanning system into a progressive scanning system, and more particularly to a scanning line converting method for a television receiver interpolating the scanning line by executing a two dimensional pseudomedian filtering process and device thereof.

A television picture is that one dimensional time sequential signal is made to a two dimensional picture by scanning, which becomes to be seen as a timely and spatially continued picture by a time and space integrating operation of time. Accordingly, when picture number per every second is less, the time integrating effect is not sufficient whereby a frame flicker is occurred, and when the scanning line number is less, the space integrating effect is not sufficient whereby it becomes a rough picture that the scanning line is visible. An interlaced scanning system such as NTSC system aims to make the picture number per every second to be more whereby reducing the frame flicker, but when comparing to a picture by a non-interlaced scanning system of scanning lines 525 doubled the scanning lines, the space integrating effect is reduced and the picture becomes rough and visible.

Thus, as a scanning line doubling method for solving a problem such as a line structure and a lack of vertical resolution occurred due to a lack of the scanning lines, a line repeating system for repeatedly viewing a previous scanning line component, an intra-field interpolation system for interpolating by averaging upper and lower scanning lines of the scanning line to be interpolated, and an inter-field interpolating system for interpolating by the scanning line of previous field of the scanning line to be interpolated, are offered.

FIG. 1(A) and (B) are respectively a circuit diagram and a conceptive diagram for explaining the line repeating system. The system comprises one line memory section 1 for outputting by one line delaying an inputting video signal Yin, a time compressors 2,3 for outputting by compressing a signal delayed through the one line memory section 1 and the video signal Yin respectively to 2/1 time, and a switch SW1 for selecting to output a desired signal among the output signals of the time compressors 2,3.

The inputting video signal Yin is delayed by the one line memory section 1 and the delayed signal is time compressed by the 2/1 time compressors. On the other hand, the original video signal Yin is time compressed by the 2/1 time compressor 3. The switch SW1 selects an output value of the first time compressor 2 for a scanning line i to be interpolated, and selects an output value of the second time compressor 3 for the original scanning lines a,b,c,d. Here, a switching clock of the switch SW1 becomes ½ of one scanning period of the inputting signal.

FIG. 2(A) and FIG. 2(B) are respectively a circuit diagram and a conceptive diagram for explaining an intra-field interpolation system. The system comprises one line memory section 4 for outputting by one line delaying the inputting video signal Yin, an adder 5 for outputtng by adding a signal delayed at the one line memory section 4 and the video signal Yin, ½ amplifier 6 for amplifying a signal outputted through the adder 5 to a ½ level, time compressors 7,8 for respectively time compressing a signal amplified through the ½ amplifier 6 and the video signal Yin, and a second switch SW2 for selecting so as to output a desired signal among the output signals of the time compressors 7,8.

A scanning line i within a field n-l,n to be interpolated is made by averaging the upper and lower scanning lines a,b and c,d. The inputting video signal Yin is one line delayed by the one line memory section 4 and the delayed signal is added to the video signal Yin by the adder 5. The added signal is applied to one terminal of the second switch SW2 through the ½ amplifier 6 and the time comprssor 7. On the other hand, the video signal Yin is applied to another terminal of the second switch SW2 through the time compressor 8. The second switch SW2 selects an output signal of the time compressor 7 for the scanning line i to be interpolate and selects an output of the time compressor 8 for the original scanning lines a,b and c,d.

FIG. 3(A) and (B) are respectively a circuit diagram and a conceptve diagram for explaining an intra-field interpolation system. The system comprises one field memory section 9 for one field delaying the inputting video signal Yin, time compressors 10,11 for compressing a signal delaed through the one field memory section 9 and the video signal Yin respectively to ½ tiem, and a third switch SW3 for selecting so as to output a desired signal among the ouput values of the time compressors 10,11.

The video signal Yin is one field delayed by the one field memory section 9 and then time compressed at the time compressor 10. And, the video signal Yin is time compressed at the time compressor 11. The third switch SW3 selects an output signal of the time compressor 10 for a scanning line to be interpolated, and selects an output signal of the time compressor 11 for oigianl scanning lines a,b, and c,d.

The insterpolating result by the conventional scanning line interpolating system described above can be understood from FIG. 3. FIG. 3 shows a degree that an original video moves during one field period, and which shows examples of picture that is a still picture, is moved by one sample to right side (→). is moved one sample to upside( ↑ ). and is moved one sample to diagonal direction( ↗ ), FIG. 3(B) is an interpolated result by a line repeating, and it is possible to know that step edge appears many in the picture having a still picture and a low speed movement, and FIG. 3(C) is an interpolated result by a line averaging and it is possible to know that an edge portion of the picture having a still picture and a low speed movement becomes indistinct, and an exact interpolation is made in the still picture but the interpolation is made inexactly in a picture having a movement.

SUMMARY OF THE INVENTION

Therefore, an object of the present invention is to provide a method and device for converting a scanning line of television receiver For interpolating a scanning line by executing a two dimensional pseudomedian filtering operation by utilizing a peripheral pixel component of a pixel to be interpolated.

Another object of the present invention is to provide a method and device for converting a scanning line of television receiver for interpolating a scanning line by executing a two dimensional pseudomedian filtering operation in response to a movement detection of video signal.

The objects as these are accomplished by a method for converting a scanning line of television receiver comprising : a step for setting a center value by a peripheral pixel component scanning system, a step for executing a two dimensional pseudomedian filtering operation by said center value and said peripheral pixel component, a step for respectively 2/1 time compressing said operation signal and said video signal, and a step for interpolating the scanning line by selectively switching said 2/1 time compressed siganls.

BRIEF DESCRIPTION OF THE DRAWINGS

FIG. 1s are diagrams for explaining a conventional line repeating system, in which FIG. 1(A) is a circuit diagram and FIG. 1(B) is a conceptive diagram, FIG. 2s are diagrams for explaining a conventional intra-field interpolating system, in which FIG. 2(A) is a circuit diagram and FIG. 2(B) is a conceptive diagram, FIG. 3s are are diagrams for explaining a conventional inter-field interpolating system, in which FIG. 3(A) is a circuit diagram and FIG. 3(B) is a conceptive diagram, FIG. 4A–4D is a diagram for explaining an interpolated result by a conventional scanning line interpolating system, FIG. 5 is a diagram showing a 3×3 squqre two dimensional pseudomedian filter applied in an embodiment of the present invention, FIG. 6s are diagrams for explaining a different point for a median filter and a pseudomedian filter, in which FIG. 6(A) is a diagram showing a fitler output for 135° edge, FIG. 6(B) is 90° edge, and FIG. 6(C) is 45° edge, FIG. 10 is a detailed circuit diagram showing another example of the sample value computer, FIG. 11s are characteristic diagrams of control signal in accordance with the edge pattern, in which FIG. 11(A)–(E) show various examples in case of diagonal edge, and FIG. 11(F) is a diagram showing a case of horizontal edge, FIG. 16 is a block diagram of 4×1 MIN filter of FIG. 13, FIG. 17 is a block diagram of 4×1 MAX filter of FIG. 12, FIG. 28 is a detailed circuit diagram of FIG. 25.

DETAILED DESCRIPTION OF THE INVENTION

Hereinafter, a preferred embodiment of the present invention will be described in more detail with reference to the accompanying drawings.

Figure 1B:
Figure 2B:
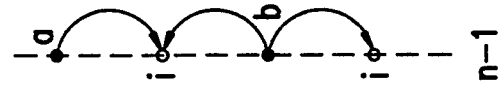
Figure 1A:
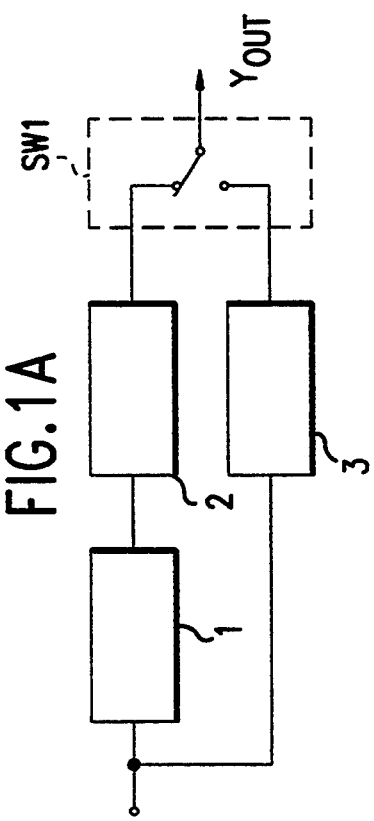
Figure 2A:
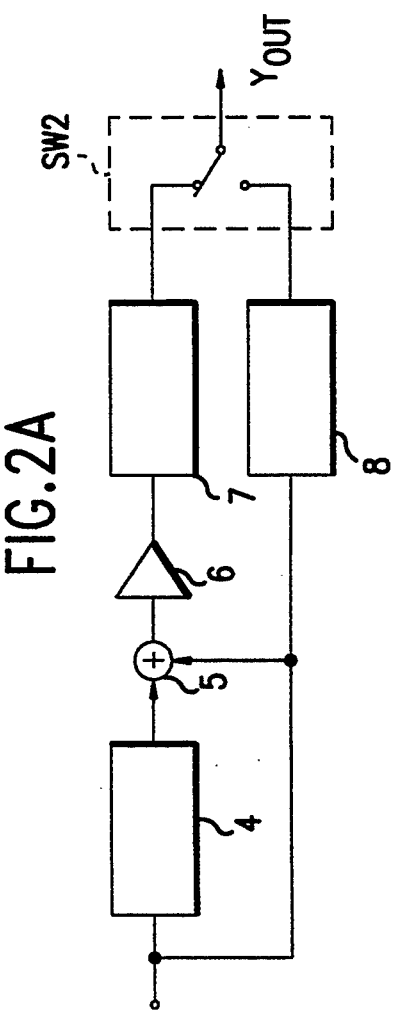
Figures 4A, 4B, 4C, 4D, 5:
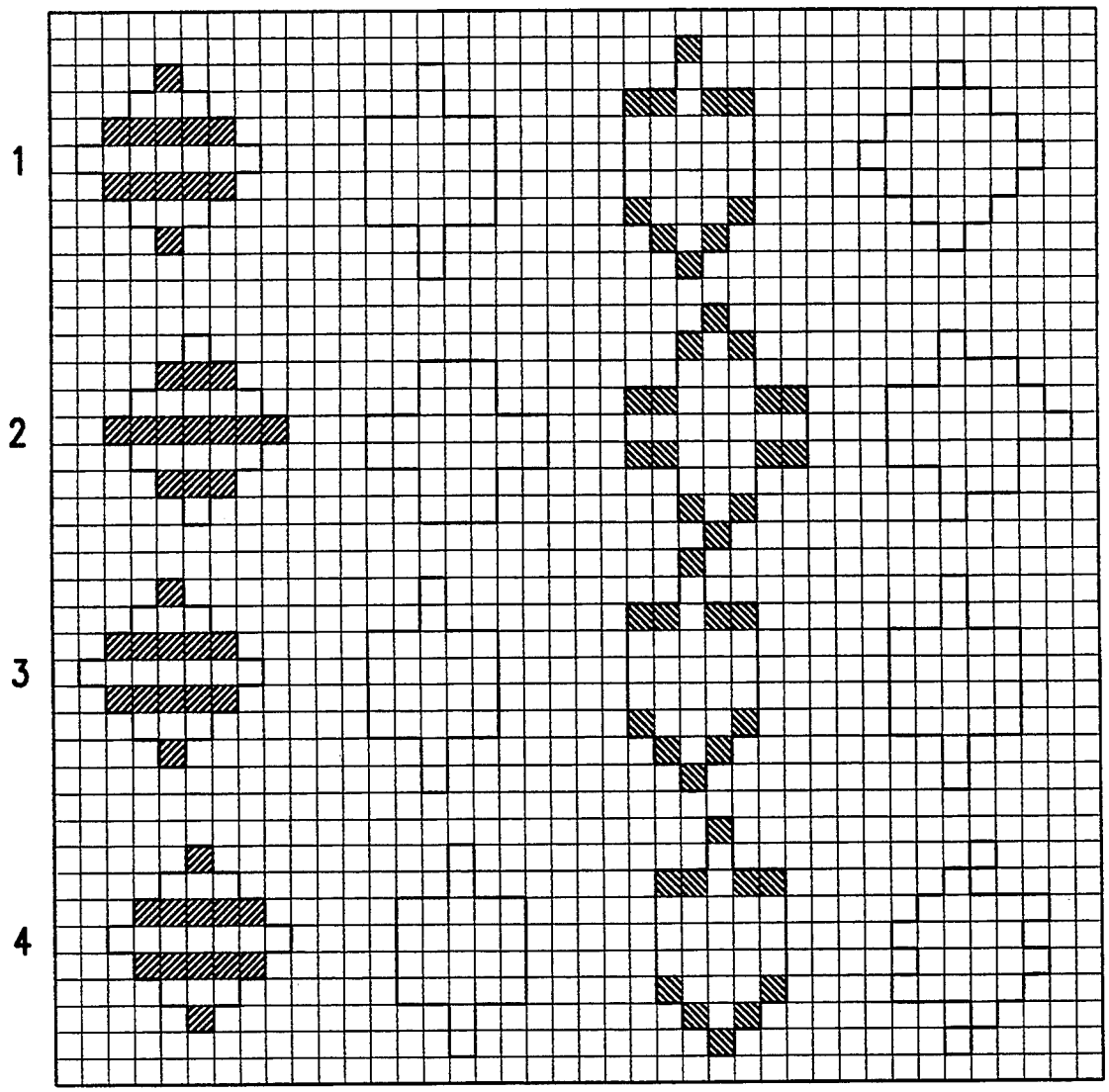

FIG. 5 is a diagram showing a 3×3 square two dimensional pseudomedian(hereinafter called as PMED) filter. In case of one dimensional PMED filter, filter length is 3, an operation of PMED is expressed as:

$$PMED\{a,b,d\}=0.5\times Max\{Min(a,b),Min(a,b)\}+0.5\times Min\{Max(a,b),Max(a,b)\}$$

when the filter length is 5, it is expressed as:

$$PMED\{a,b,c,d,e\}=0.5\times Max\{Min(a,b,c),Min(b,c,d),Min(c,d,e)\}+0.5\times Min\{Max(a,b,c),Max(b,c,d),Max(c,d,e)\}$$

The filter characteristic of the two dimensional pseudomedian filter is changed in accordance with the filter size and form. For instance, in case of selecting the filter size and form as FIG. 5, operation of the PMED filter is expressed as:

$$PMED\{a,b,c,d,e,f,g,h,i\} =$$
$$0.5 \times Max\{Min(a,b,d,e), Min(b,c,e,f),$$
$$Min(d,e,g,h),Min(e,f,g,i)\} + 0.5 \times$$
$$Min\{Max(a,f,d,e),Max(b,c,e,f),$$
$$Max(d,e,g,h),Max(e,f,g,i)\}$$

FIG. 6 shows a different point of the median filter and the pseudomedian filter in accordance with the edge characteristic. FIG. 6(A) shows an output when 5×5 square median filter and PMED filter are applied to the 135° edge, FIG. 6(B) shows a filter output when 5×5 square median filter and PMED filter are applied to the 90° edge, and FIG. 6(C) shows an output of filter when 5×5 square median filter and PMED filter are applied to the 45° edge.

It is possible to know from the filter output of FIG. 6(A) to FIG. 6(C) that the PMED filter corresponds better for the edge characteristic than the median filter, and since the PMED filter uses a linear operation as an adding process, an aliasing problem occurring at the median filter can be solved, and since a complete median value is not calculated, a calculating amount becomes decreased.

Figure 7:
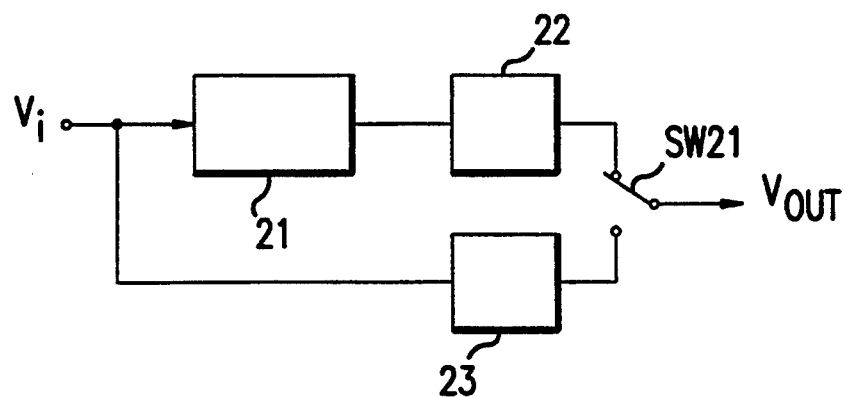
FIG. 7 is a block diagram of a line doubler in accordance with the present invention.

FIG. 7 is a block diagram of entire configuration of a line doubler in accordance with an embodiment of the present invention, which comprises a PMED filter section 21 for outputting by making an inputting video signal Vi to a signal utilized for an interpolation; a time compressors 22,23 for 2/1 time compressing respectively a signal to be utilized for interpolation at the PMED filtering section 21 and the inputting video signal Vi; and a switch SW21 for outputting by selecting in accordance with each position to be interpolated and original signal position among the time compressed signals at the time compressors 22,23.

Figure 8:
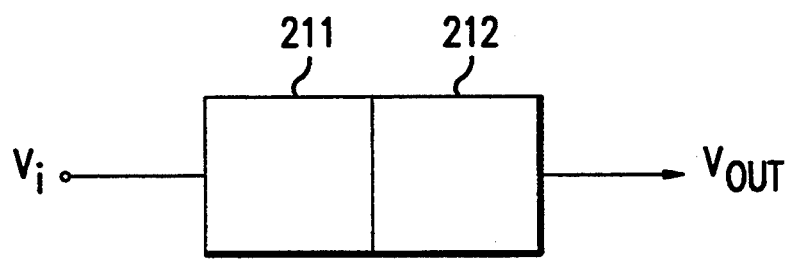
FIG. 8 is a detailed block diagram of a pseudomedian filtering section.

FIG. 8 is a detailed block diagram of PMED filtering section 21 of FIG. 7, which comprises a computing section 211 for computing a sample value to be applied to a center value of the PMED filter 212; and a PMED filter 212 for executing a filtering operation by utilizing peripheral pixel to a sample value computed at the computing section 211 and upper and lower scanning lines of pixel to be interpolated.

Figure 9:
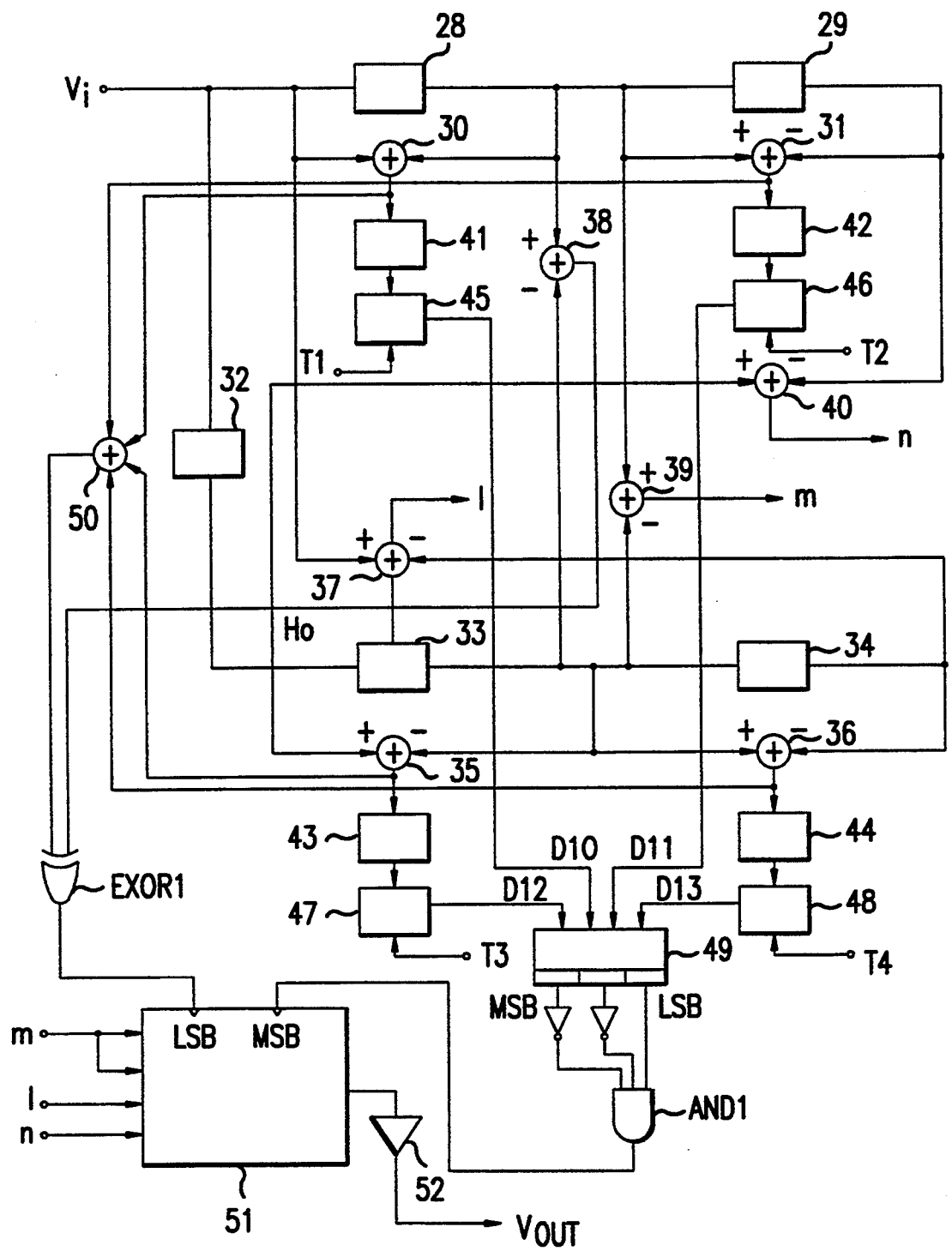
FIG. 9 is a detailed circuit diagram showing an example of a sample value computer.

FIG. 9 is an example of detailed circuit diagram of the computing section 211 of FIG. 8. It comprises: sample memory sections 28,29 for delaying the inputting video signal Vi in turn; an adder 30 for synthesizing the inputting video signal Vi and a signal delayed at the sample memory section 28; an adder 31 for synthesizing a delayed signal of the sample memory section 28 and a delayed signal of the sample memory section 29; one line memory section 32 for outputting by delaying the inputting video signal Vi; sample memory sections 33,34 for outputting by delaying in turn again the delayed signal of the one line memory section 32; an adder 35 for synthesizing the delayed signals of the one line memory section 32 and the sample memory section 33; an adder 36 for synthesizing the delayed signals of the sample memory sections 33,34; an adder 37 for summing the signals delayed by the inputting video siganl Vi and the sample memory section 34 whereby making a sum l of 135 diagonal component signal; adders 38,39 for summing the delayed signals of the sample memory sections 28,33 whereby generating a vertical direction control signal Ho and simultaneously making a sum m of a vertical direction component signal; an adder 40 for summing the delayed signal of the sample memory section 29 and the delayed signal of the one line memory section 32 whereby making a sum n of 45 diagonal component signal; absolute value generating sections 41,42,43,44 for respectively generating an absolute value by the signals outputted at the adders 30,31,35,36; comparing sections 45,46,47,48 for comparing the absolute values generated at the absolute value generating sections 41,42,43,44 with each established reference values T1,T2,T3,T4; a bit adder 49 for summing control signals D10,D11,D12,D13 outputted from the comparing sections 45,46,47,48 and then outputting two high-order bits and one low-order bit through an AND gate AND1; an adder 50 for summing the output signals of the adders 30,31,35,36 whereby outputting a sign bit 350 of difference signal component; an exclusive OR gate EXOR1 for exclusively logically summing the sign bit 450 of said adder 50 and the horizontal control signal Ho of said adder 38; a multiplexer 51 for selecting the sum n of vertical component and the sum n,l of 45 and 135 diagonal components in accordance with te high-order and low-order control signals MSB,LSB outputted from the AND gate AND1 and the exclusive OR gate EXOR1 whereby outputting through the ½ amplifier 152.

Figure 10:
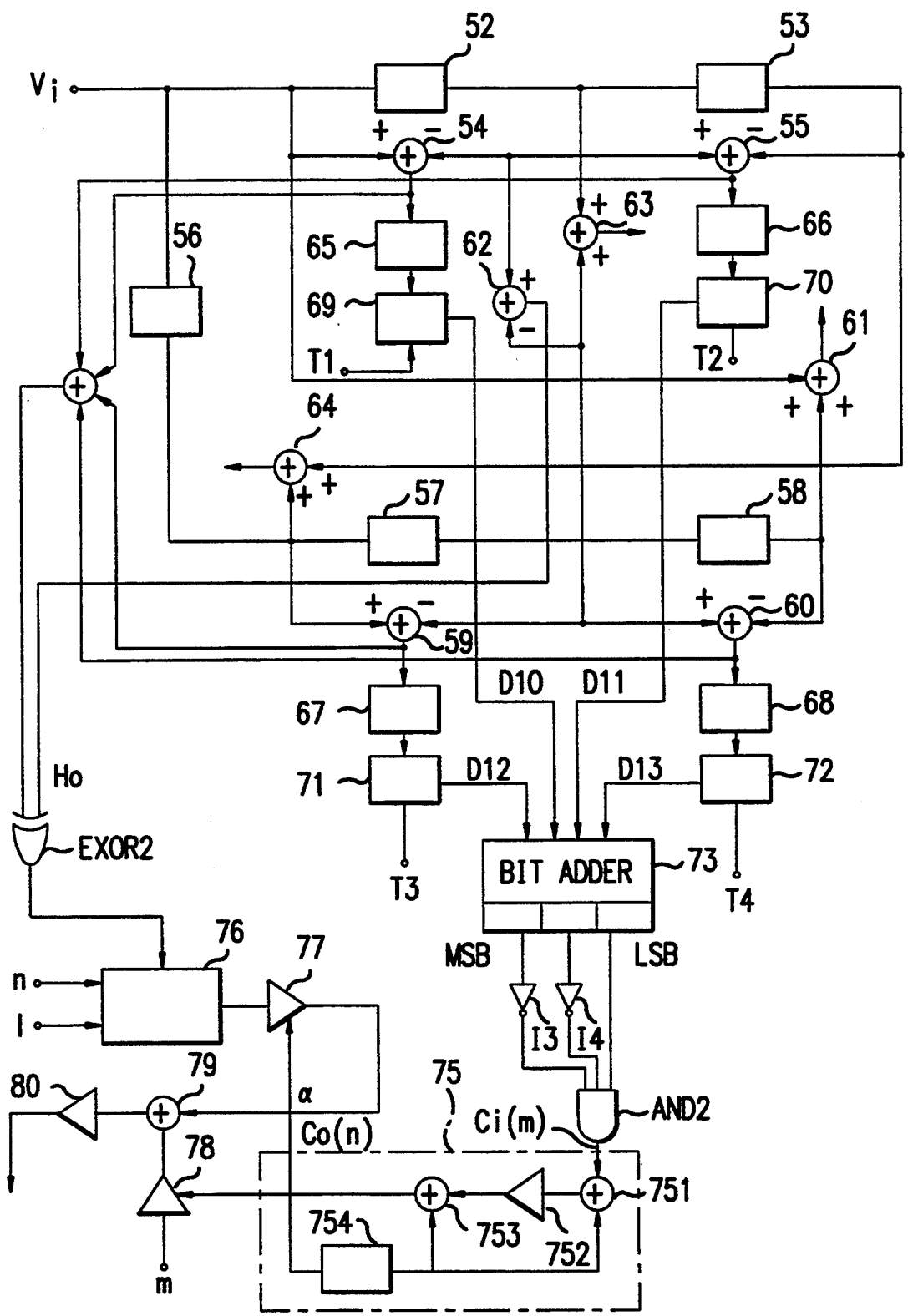

And, FIG. 10 is another example of the detailed circuit diagram of the computing section 211 of FIG. 8. It comprises: an inputting video signal Vi and one line memory section 56; an adder 61 for summing the signals delayed by the sample memory sections 57,58 whereby making the sum l of 135 diagonal component signal; adders 62,63 for summing the delayed signal of the sample memory section 52 and the signal delayed by the one line memory section 56 and the sample memory section 57 whereby making a sum m of the vertical direction control signal Ho and the vertical direction component signal; an adder 64 for summing the delayed signal of the sample memory sections 52,53 and the delayed signal of the one line memory section 56 whereby making a sum n of 45 diagonal component signal; comparing sections 69,70,71,72 for comparing the absolute values by the adders 54,55,59,60 and the absolute value generating sections 65,66,67,68 with the established reference values T1,T2,T3,T4 whereby outputting respectively the control signals D10,D11,D12,D13 in accordance with the edge pattern; a bit adder for adding the control signals D10,D11,D12,D13 and then outputting two high-order bits and one low-order bit through the inverter 13,14 through the AND gate AND2; an exclusive OR gate EXOR2 for exclusively logically summing the signal summed the output signal of the adders 54,55,59,60 at the adder 74 and the horizontal control signal outputted from a sign bit 174; IIR filter section 75 which consists of two adders 751,753 and an amplifier 752 and a sample memory section 754 and amplifies an output signal of an AND gate AND2 at an amplifier 752 through the adder 751 and then generates an output control signal α from the amplified signal through an adder 753 and simultaneously delays the output control signal at a sample memory section 754 whereby feeds back to the adders 751,753; a multiplexer 76 for outputting by selecting the sums n,l of the 45° and 135° diagonal components in accordance with the output signal of the exclusive OR gate EXOR 2; a variable amplifier 77 for variably amplifying the output of the multiplexer 76 by the output control signal α from the IIR filter section 75; a variable amplifier 78 for variably amplifying the sum m of the vertical component by the output control signal of the IIR filter section 75; and an adder 79 for synthesizing the output signal of the variable amplifiers 77,78 whereby outputting to an ½ amplifier 80.

Explaining an operation of the line doubler of the present invention constructed as these, it will be as follows.

The line doubler of FIG. 7 makes a signal to be utilized for an interpolation by the PMED filtering section 21 offered as in FIG. 9 and FIG. 10 by taking a sepatated luminance signal and a chrominance signal as the inputting signal Vi relative to the conventional TV signal.

This signal to be utilized for the interpolation and the inputting video signal Vi are respectively ½ time compressed at the time compressors 22,23 and then outputted by selecting the output signal of the time compressor 23 for an original signal position by the switch SW21, while selecting the output signal of the time compressor 22 for the position to be interpolated. At this moment, a switching clock of the switch SW21 is TH/1 (for instance, the TH is approximately 63.5 μsec in case of NTSC).

The video signal Vi of the interlaced scanning system inputted to the computing section 211 makes a sum l of 135 diagonal component signal by summing with the signal delayed by the one line memory section 32 and the sample memory sections 33,34, and the delayed signal of the sample memory section 28 and the signal delayed by the one line memory section 32 and the sample memory section 33 are summed whereby a sum m of the vertical direction component signal is made. And, the signals delayed by the sample memory sections 23,29 and the delayed signal of the one line memory section 32 are summed whereby a summed signal n of the 45 diagonal component signal is made.

And, the output signals of the adders 30,31,35,38 generate the control signals D10,D11,D12,D13 in accordance with the edge pattern as in FIG. 11(A) to (F) respectively through the absolute value generating sections 41,42,43,44 and the comparing sections 45,48,47,48, and the vertical direction control signal Ho uses an output signal of the adder 38 being a sign bit of the difference signal component of vertical direction.

The control signals D10,D11,D12,D13 are summed at a bit adder 49 and then two high-order bits(MSB) and one low-order bit(LSB) by the inverters I1,I2 are inputted to the AND gate AND1, at this moment, when the edge pattern is a (45° or 135°) of diagonal direction, the output of the AND gate AND1 is high state, and when it is an edge of horizontal or vertical direction, the output of the AND gate AND1 becomes low state.

And, the difference signals made by the adders 30,31,35,38 are summed at the adder 50 whereby outputs as a sign bit (1 bit). The sign bit (1 bit) is exclusively logically summed with the signal bit(Ho) of the vertical difference signal at the exclusive OR gate EXOR1, and when it is same signal bit, since it is 45° edge, a low level (0) value is outputted, and when it is other signal bit, since it is 135° edge, a high level(1) value is ouputted.

The output signal of the AND gate AND1 and the output signal of the exclusive OR gate EXOR1 are used as high order and low order control signals MSB,LSB of the multiplexer 51, and when two control signals MSB,LSB are all high state 1,1, n value being a sum of 45° diagonal component is outputted as 0,0, or else it is 0,1, and m value being a sum of vertical component is outputted. And, when it is 1,0, 1 value being a sum of 135° diagonal component is outputted.

The output signal of the multiplexer 51 is ampified by the ½ amplifier 52 and then applied to the PMED filter 212.

On the other hand, the computing section 211 of FIG. 10 showing another example of the computing section 211 makes 1 being a sum of 135° diagonal component, m being a sum of vertical direction component, and n value being a sum of 45° diagonal component by a method as described in FIG. 9, and makes the control signals D10,D11,D12,D13 and the vertical direction control signal Ho.

The output signal of the exclusive OR gate EXOR2, that is, the control signal judged whether the edge pattern of diagonal direction is 45° or 135° is applied to the multiplexer 76 whereby outputs a sum 1 of 135° component or a sum n of 45° component.

The output signal of the AND gate AND2, that is, the control signal judged yes or no for the diagonal edge pattern is maintained with consistency by the infinite impulse response IIR filter section 75. The IIR filter section 75 is a filter which maintains a consistency of the control signal judging the edge pattern and for preventing a remarkable picture quality reducing phenomenon due to a judgement error, and when assuming that the input is Ci(n), its output is computed as (Co(n)=K Ci(n)+(1−K)Co(n−1).

And, a frequency response of the IIR filter section 75 is $$H(e^{j\omega}) = \frac{1}{1 - (1-K)e^{-j\omega}}$$

and it is possible to know that an output signal being sensitive to the input signal is generated simultaneously with a K(constant) value becomes bigger. According to this embodiment, K is suitable to select a value of 0.5–0.9.

The output signal Co(n) of the IIR filter section 75 is multiplied by a sum of diagonal component being an output of the multipleser 76 at the variable amplifier 77, and multiplied by a sum of the vertical component at the variable amplifier 78.

These multiplied two signals are added by the adder 79 and then it is used as a sample to be utilized for the interpolation through the ½ amplifier 80.

FIG. 11 is a diagram showing a characteristic of the control signal in accordance with the edge pattern, the cotrol signals D10,D11,D12,D13,Ho) can be obtained by following expression.

D10=a-b, that is, [X−1(n−1)-X−1(n)],
D11=b-c, that is, [X−1(n)−X−1(n+1)],
D12=d-e, that is, [X+1(n−1)-X+1(n)],
D13=e-f, that is, [X+1(n)−X−1(n+1)],
Ho=b-e, that is, [X−1(n)−X+1(n)]

In case of the diagonal edge changing in diagonal direction as FIG. 11(A) to FIG. 11(D), a value excessing a predetermined threshold voltage of the edge pattern control signals D10,D11,D12,D13 is only one, and in case of 135 edge, it is possible to know that a value exclusively and logically summed the sign bit of sum of the edge pattern control signals D10,D11,D12,D13 and the sign bit of the vertical direction control signal Ho is +1. And, in case of 45 edge, a value exclusively and logically summed the sign bit of sum of the edge pattern control signals D10,D11,D12,D13 and the sign bit of the vertical direction control signal Ho becomes 0.

And, in case of the vertical edge as FIG. 11(E), the vertical direction control signal Ho can not exceeds a predetermined threshold voltage value, and it is possible to know that a value exceeding a predetermined threshold votage in the edge pattern control signals D10,D11,D12,D13 is 0 or more than 2.

And, in case of the horizontal edge as FIG. 11(F), the vertical direction control signal Ho exceeds a predetermined threshold voltage, and it is possible to know that a value exceeding a predetermined threshold voltage of the edge pattern control signals D10,D11,D12,D13 is not present.

Figure 12:
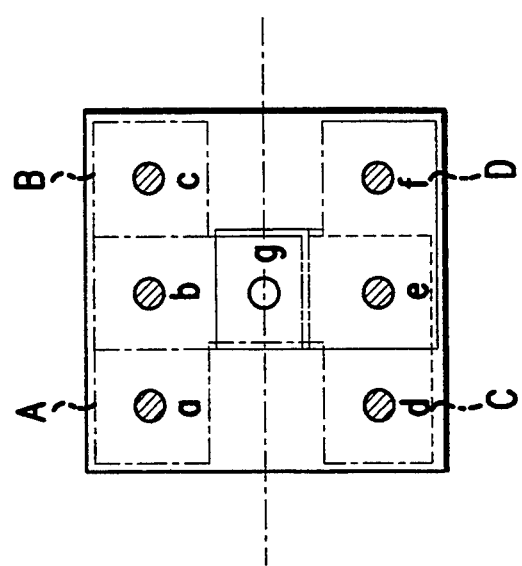
FIG. 12 is a diagram for explaining an offered interpolating method in a two dimensional region in accordance with the present invention.

Accordingly, in a two dimensional region as FIG. 12, when assuming a pixel to be interpolated is i, the pixel components a,b,c,d,e,f of upper and lower scanning lines of the pixel position to be interpolated and a pixel component g to be substituted to a center of the pseudomedian filter are executed by a pseudomedian filter process converted to be suitable for the scanning line interpolation so that a pixel value to be utilized for the interpolation is computed. The computation of this pixel(sample) value g is obtained by considering a complexity of the picture quality and the hardware, and in the present invention, it will be explained by exemplifying for a sample value gernerating system in accordance with the edge pattern, a system utilizing a vertical average value, a system utilizing vertical average and previous field value, and a system of not using center sample value.
is A value of the pixel i to be finally interpolated obtained by PMED computing the pixel components a,b,c,d,e,f of the upper and lower scanning lines of the pixel position to be interpolated and a sample value g computed in accordance with the edge characteristic, and its computation is as follows.

$$PMED\{a,b,c,g,d,e,f\} = \\ 0.5 \times \text{Min}\{\text{Max}(a,b,g), \text{Max}(b,c,g), \text{Max}(d,e,g), \\ \text{Max}(e,f,g)\} + 0.5 \times \text{Max}\{\text{Min}(a,b,g), \\ \text{Max}(b,c,g), \text{Max}(d,e,g), \text{Max}(e,f,g)\} \quad (1)$$

For the PMED filter computation changed as this, the value g computed in accordance with the edge pattern is used for 4 times, and b,c being upper and lower pixels are used by 2 times, and a,c,d,f being a diagonal component is used for one time. That is, an applying ratio of the used pixel is 4:2:1.

And, the PMED computation in case of not using the central sample value is as follows.

$$PMED\{a,b,c,d,e,f\} = \\ 0.5 \times \text{Min}\{\text{Max}(b,c), \text{Max}(d,e), \\ \text{Max}(e,f)\} + 0.5 \times \text{Max}\{\text{Min}(a,b), \text{Min}(b,c), \\ \text{Min}(d,e), \text{Max}(e,f)\} \quad (2)$$

For the above described PMED computation, the upper and lower pixels of position to be interpolated are used for two times and the diagonal component is used by one time.

Figure 13:
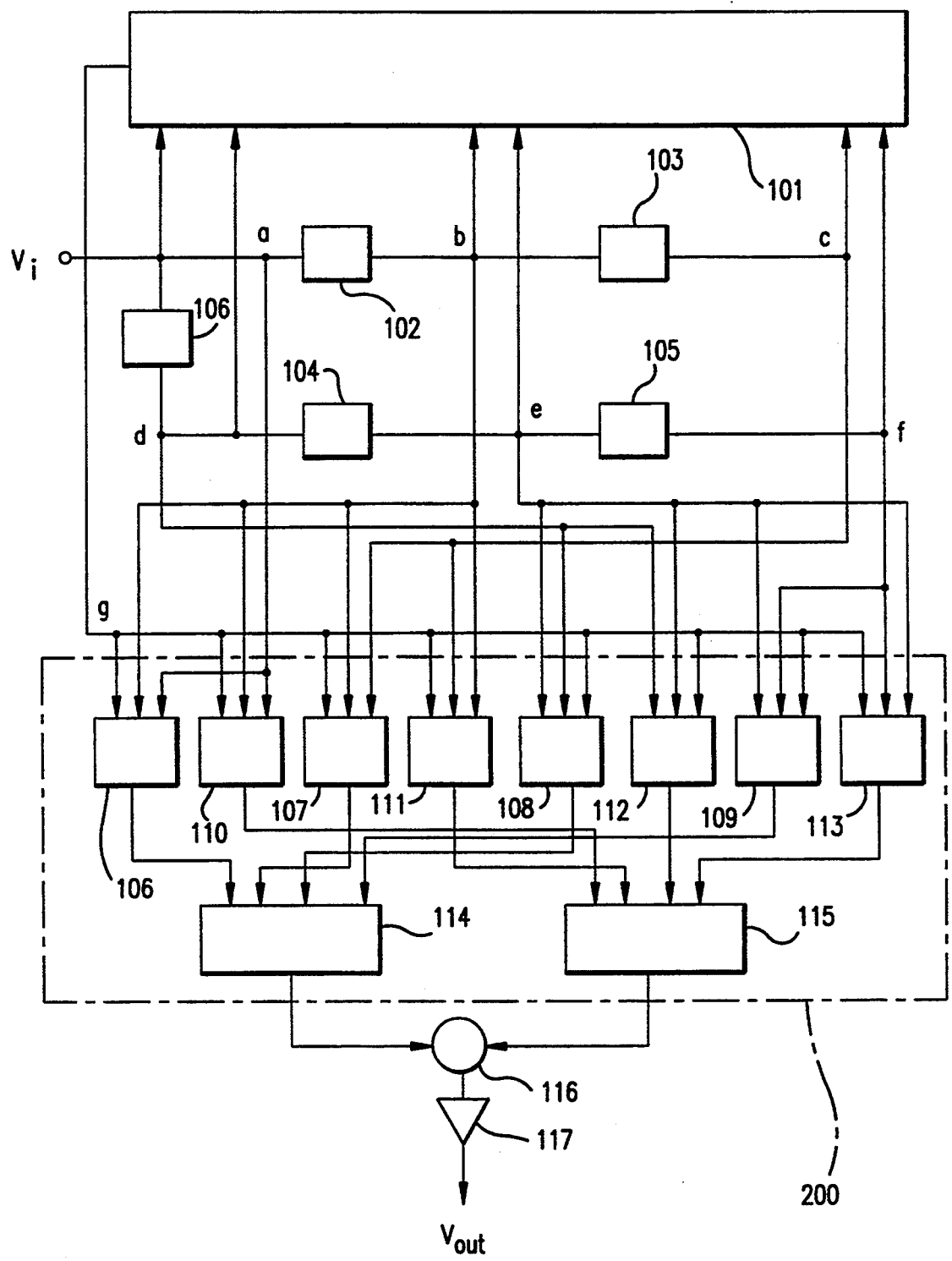
FIG. 13 is a circuit diagram of a scanning line interpolater using a pseudomedian filter considered with an edge pattern.

FIG. 13 is a diagram of entire detailed configuration of the PMED filtering section using the PMED filter considered the edge pattern. It comprises : one line memory section 106 for delaying a video signal Vi of inputting interlaced scanning system; sample memory sections 102,103,104,105 for delaying in turn the signal delayed at the inputting video signal Vi and the one line memory section 206; a sample value computer 101 for computing the sample value in accordance with the edge pattern by a signal delayed through the sample memory sections 102,103,104,105; a filtering section 200 for combining the sample value g computed at the sample value computer 101 and the delayed samples a,b,c,d,e,f and processing through four 3×1 MIN filters 110,111,112,113 and four 3×1 MAX filters 106,107,108,109 and fitering processing the output of MIN filter at 4×1 MAX filter 115 while the output of the MAX filter at 4×1 MIN filter 114; an adder 116 for synthesizing the output of the 4×1 MAX filter 115 and the 4×1 MIN filter 114; and a ½ amplifier 117 for amplifying the synthesized signal.

The inputting video signal Vi of the interlaced scanning system is delayed by the sample memory sections 102,103,104,105, and this delayed signal in sample value in accordance with the edge pattern is computed by the sample value computer 101.

The sample value g computed as these and the delayed samples a,b,c,d,e,f are filtering processed through four 3×1 MIN filters 110,111,112,113 and four 3×1 MAX filters 106,107,108,109 and then the outputs of the MIN filters 110,111,112,113 are filtering processed at the 4×1 MAX filter 115, while the outputs of the MAX filters 106,107,108,109 are filtering processed at the 4×1 MIN filter 114. The outputs of the 4×1 MAX filter 115 and the 4×1 MIN filter 114 become to obtain an average value through the adder 116 and the ½ amplifier 117, and according to this, a pseudomedian filtering process changed so as to be fit for the interpolation is executed.

Accordingly, the final sample value g to be utilized for the interpolation is computed as follows as described already.

$$PMED\{a,b,c,d,e,f,g\} = \\ 0.5 \times \text{Min}\{\text{Max}(a,b,g), \text{Max}(b,c,g), \\ \text{Max}(a,b,g), \text{Min}(b,c,g), \text{Min}(d,e,g), \\ \text{Min}(e,f,g)\}$$

Figure 14:
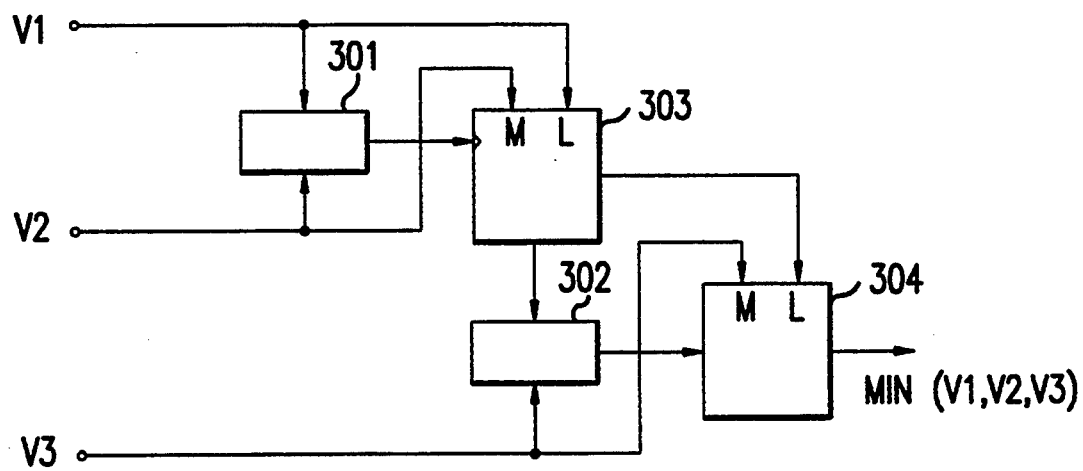
FIG. 14 is a block diagram of 3×1 MIN filter of FIG. 13.
Figure 15:
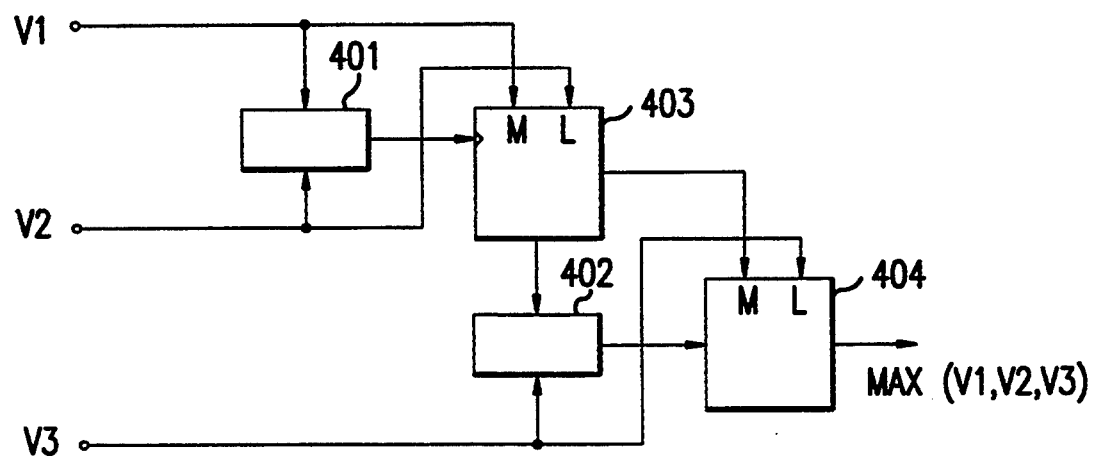
FIG. 15 is a block diagram of 3×1 MAX filter of FIG. 13.

The configuration of 3×1 MIN,MAX configuration is same as shown in FIG. 14 and FIG. 15. The 3×1 MIN filter comprises : 2×1 multiplexer 303 for selecting one of signals V1,V2 inputted in accordance with the compared output of the comparator 301 taking input of signals V1,V2; a comparator 302 for comparing the output signal of the 2×1 multiplexer 303 and another input signal V3; and 2×1 multiplexer 304 for selecting the 2×1 multiplexer 303 and the input signal V3 in accordance with the output control signal of the comparators 302,402.

The 3×1 MAX filter comprises : a 2×1 multiplexer 403 for selecting one of signals V1,V2 iputted in accordance with the compared output of the comparator 401 taking the input signals V1,V2 as an input; a comparator 402 for comparing the output signal of the 2×1 multiplexer 403 and another input signal V3; and a 2×1 multiplexer 404 for selecting one of the 2×1 multiplexer 403 and the inputting signal V3 in accordance with the output control signal of the comparator 402 whereby outputting the MAX output signals V1,V2,V3.

The construction of the 4×1 MIN,MAX filters is same as shown in FIG. 16 and FIG. 17. The 4×1 NIN filter comprises : a 3×1 MIN filter 501 for processing by being applied with the signals V1,V2,V3; a comparator 502 for comparing the output of the 3×1 MIN filter 501 and another inputting signal V4; and a 2×1 multiplexer 503 for selecting one of the output of the 3×1 MIN filter 501 and the inputting signal V4 in accordance with the output signal of the comparator 502 whereby outputting the MIN output signals V1,V2,V3,V4.

The 4×1 MAX filter comprises : a 3×1 MAX filter 601 for processing by being applied with the signals V1,V2,V3; a comparator 802 for comparing the output of the 3×1 MAX filter 601 and another input signal V4; and a 2×1 multiplexer 803 for selecting one of the output of the 3×1 MAX filter 801 and the input signal V4 whereby outputting the MAX output signals V1,V2,V3,V4.

Figure 18:
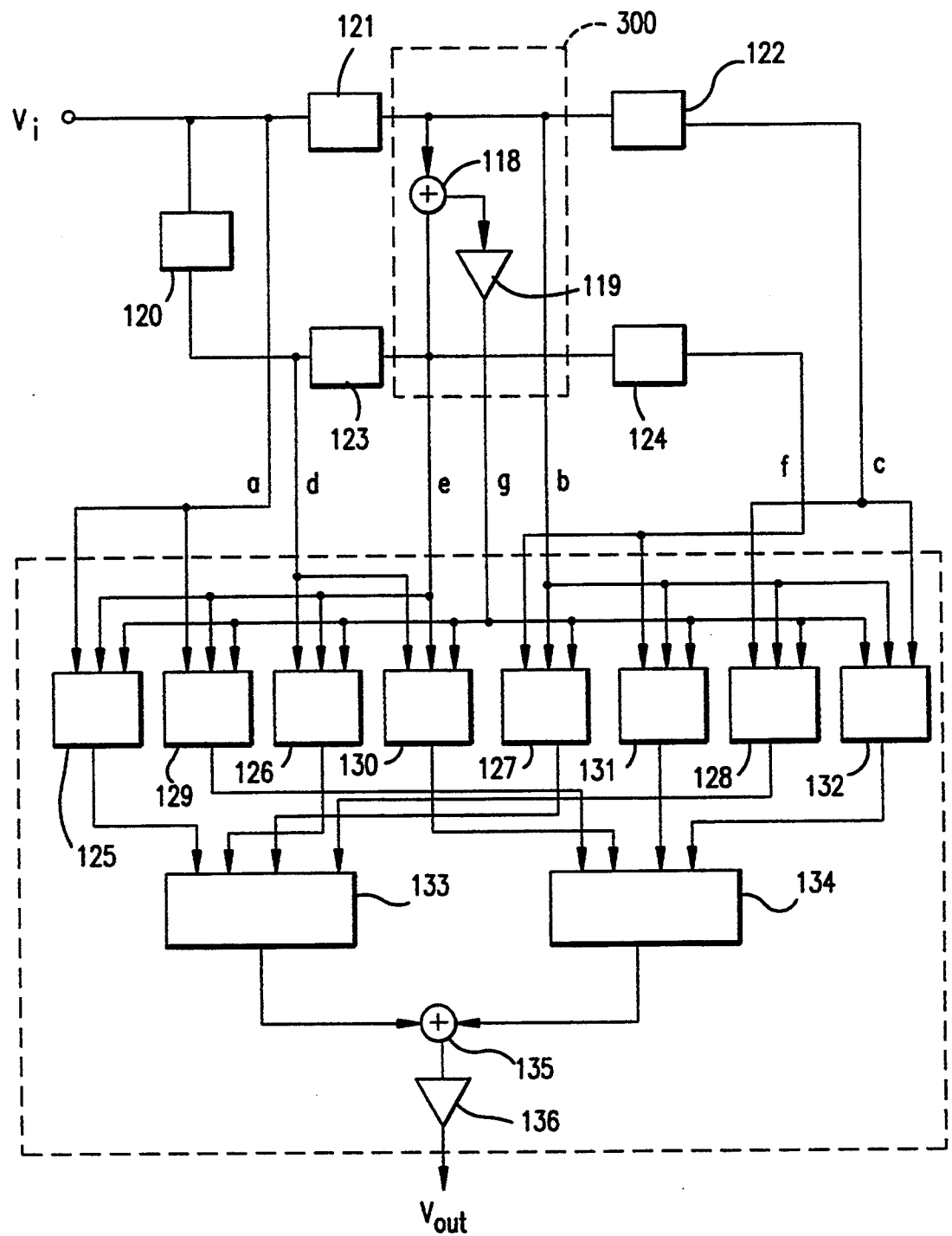
FIG. 18 is a circuit diagram of a scanning line interpolater using a pseudomedian filter considering a vertical average signal.

FIG. 18 is a diagram showing a PMED filtering section using a PMED filter using an average value of the upper and lower pixels of the sample position to be interpolated as a center value g, in which a computing section 300 of the center value g is added to the construction of the PMED filtering section of FIG. 13. The computing section 300 of the center value g is constructed by an adder 118 and a ½ amplifier 119. Here, an average value of the pixel is used with $$g = \frac{b+e}{2}$$

in FIG. 5.

Figure 19:
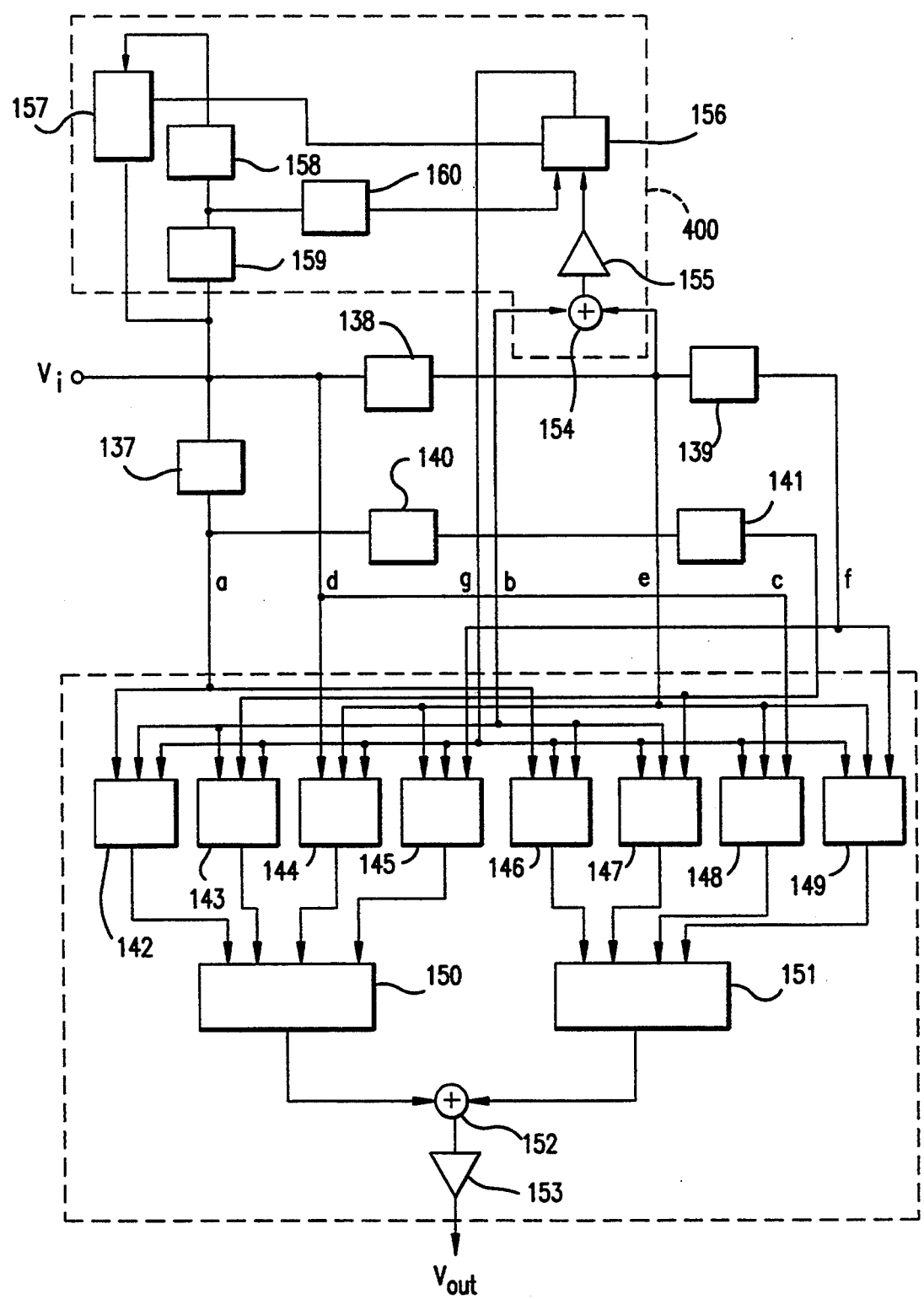
FIG. 19 is a circuit of a scanning line interpolater using a pseudomedian filter utilizing a movement information.

FIG. 19 is a circuit diagram of a scanning line interpolator for PMED filtering processing by utilizing movement information, in which a center value computing section 400 made of a movement detector 157, two one field memory sections 158,159, a sample memory section 160, a multiplexer 156, a ½ amplifier 155, and an adder 154 is added to the construction of the PMED filtering section of FIG. 13.

Figure 20:
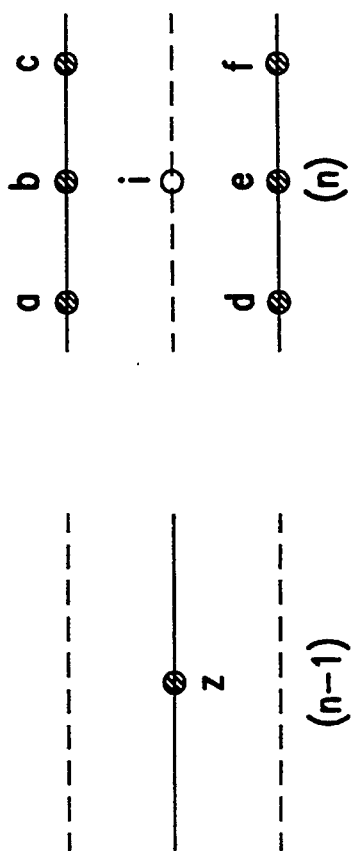
FIG. 20 is a diagram for explaining a method for determining a center value of the pseudomedian filter by utilizing a movement information.

FIG. 20 is a conceptive diagram for explaining a system for determining a center value of the PMED filter by utilizing a movement information. When assuming the sample to be interpolated is i, a sample used for the interpolation uses an average value of pixels a,b,c,d,e,f existing at upper and lower scanning lines of the sample i to be interpolated and a sample z of previous field, and upper and lower pixels of the sample i to be interpolated.

If in case that the sample i portion has no movement, g=z is used, and in case of having a movement, $$g = \frac{b+e}{2}$$

is used, and a pixel value to be finally used for the interpolation becomes an output of the PMED filter appeared in the expression (1).

Figure 21:
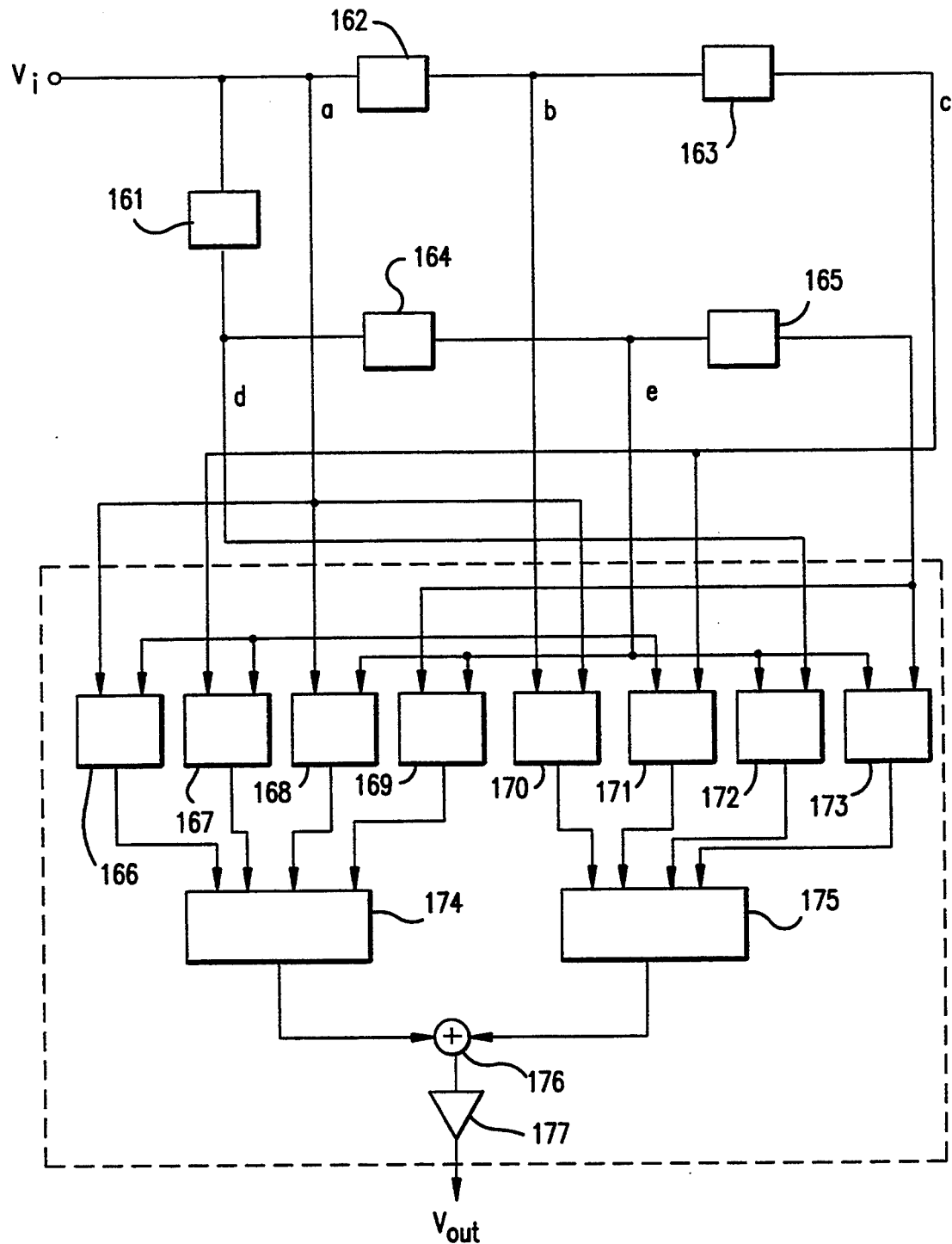
FIG. 21 is a circuit diagram of a scanning interpolater by a pseudomedian filter which does not use a center sample value.
Figure 22:
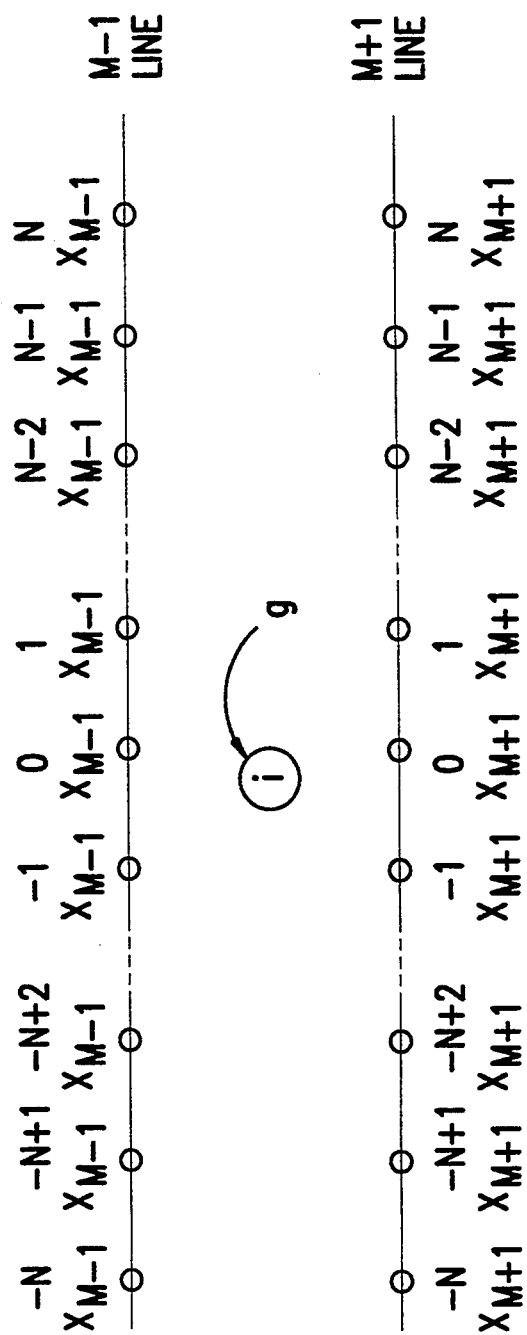
FIG. 22 is a diagram showing an example expanded with the pseudomedian filter.

FIG. 21 is a block diagram of a scanning interpolator by the PMED filter of not using the center value g appeared in the expression (2), in which 3×1 and, 2×1 instead of MAX filter, and MAX filters 166,167,168,169,170,171,172,173 are used. FIG. 22 is a diagram showing an example expanded the pseudomedian filter for the interpolating sample calculating computation, which is expanded to a case utilizing 4N+2 pixels existing at the upper and lower scanning lines of the sample i when assuming the sample to be interpolated is i.

In case of not using the center value g of the PMED filter, (N+1)×1 MIN filter seeking a mimimum value of (N+1) pixel values for the pixel existing at the upper and lower scanning lines are used in (2N+2).

The output of the (2N+2) MIN filters are inputted to (2N+2)×1 MAX filters and a maximum value of the MIN filter output is selected, and the output of (2N+2) MAX filters are inputted to (2N+2)×1MIN filters whereby a minimum value of the outputs of the MAX filters is selected. The outputs of the (2N+2)×1 MIN filter and the (2N+2)×1 MAX filter are added and then ½ amplified value is a value to be applied to the sample i to be interpolated. The sample to be interpolated is obtained by following expression.

$$i = PMED\{X_{M-1}^{-N}, X_{M-1}^{-N+1}, \ldots, X_{M-1}^{-1}, \quad \text{(Expression 3)}$$
$$X_{M-1}^{0}, X_{M-1}^{1}, \ldots, X_{M-1}^{N-1}, X_{M-1}^{N}, X_{M+1}^{-N}, X_{M+1}^{-N+1}, \ldots,$$
$$X_{M+1}^{-1}, X_{M+1}^{0}, X_{M+1}^{1}, \ldots, X_{M+1}^{N-1}, X_{M+1}^{N}\}$$
$$= 0.5 \times \text{Max} \times \{\text{Min}(X_{M-1}^{-N}, X_{M-1}^{-N+1}, \ldots, X_{M-1}^{-1}, X_{M-1}^{0}),$$
$$\text{Min}(X_{M-1}^{-N+1}, X_{M-1}^{-N+2}, \ldots, X_{M-1}^{0}, X_{M-1}^{1}),$$

$$\text{Min}(X_{M-1}^{0}, X_{M-1}^{1}, \ldots, X_{M-1}^{N-1}, X_{M-1}^{N}),$$
$$\text{Min}(X_{M+1}^{-N+1}, X_{M+1}^{-N+2}, \ldots, X_{M+1}^{0}, X_{M+1}^{1}),$$
$$\text{Min}(X_{M+1}^{0}, X_{M+1}^{1}, \ldots, X_{M+1}^{N-1}, X_{M+1}^{N}),$$

-continued $$\text{Min}(X_{M+1}^{0}, X_{M+1}^{1}, \ldots, X_{M+1}^{N-1}, X_{M+1}^{N})\} +$$
$$0.5 \times \text{Min}\{\text{Max}(X_{M-1}^{-N}, X_{M-1}^{-N+1}, \ldots, X_{M-1}^{-1}, X_{M-1}^{0}),$$
$$\text{Max}(X_{M-1}^{-N+1}, X_{M-1}^{-N+2}, \ldots, X_{M-1}^{0}, X_{M-1}^{1}),$$

$$\text{Max}(X_{M-1}^{0}, X_{M-1}^{1}, \ldots, X_{M-1}^{N-1}, X_{M-1}^{N}),$$
$$\text{Max}(X_{M+1}^{-N+1}, X_{M+1}^{-N+2}, \ldots, X_{M+1}^{0}, X_{M+1}^{1}),$$
$$\text{Max}(X_{M+1}^{0}, X_{M+1}^{1}, \ldots, X_{M+1}^{N-1}, X_{M+1}^{N}),$$

$$\text{Max}(X_{M+1}^{0}, X_{M+1}^{1}, \ldots, X_{M+1}^{N-1}, X_{M+1}^{N})\}$$

In case of using a center value g of the PMED filter, (N+2)×1Min filter for seeking a minimum value of (N+2) pixel values including a center value g calculated so as to fit to interpolate by using the pixel values existing at the upper and lower scanning lines and the PMED filter is used, and (N+2)×1 Max filter for seeking a maximum value of the pixels of (N+2) including a center value g are used in (N+2).

The output of the (2N+2) Min filters are inputted to the (2N+2)×1 Max filter and selects a maximum value of the outputs of the (N+2)×1 Max filter, and the output of the (2N+2) Max filter is inputted to the (2N+2)×1Min filter whereby becomes to select minimum value of the output of the (N+2)×1 Max filter.

The outputs of the (2N+2l)×1Min filter and the (2N+1)×1 Max filter are added and then ½ amplfied value is applied to the sample i to be interpolated. The sample to be interpolated is obtained by following expression.

$$i = PMED\{X_{M-1}^{-N}, X_{M-1}^{-N+1}, \ldots, X_{M-1}^{-1}, \quad \text{(Expression 4)}$$
$$X_{M-1}^{0}, X_{M-1}^{1}, \ldots, X_{M-1}^{N-1}, X_{M-1}^{N}, X_{M+1}^{-N}, X_{M+1}^{-N+1}, \ldots,$$
$$X_{M+1}^{-1}, X_{M+1}^{0}, X_{M+1}^{1}, \ldots, X_{M+1}^{N-1}, X_{M+1}^{N}, g\}$$
$$= 0.5 \times \text{Max} \times \{\text{Min}(X_{M-1}^{-N}, X_{M-1}^{-N+1}, \ldots,$$
$$X_{M-1}^{-1}, X_{M-1}^{0}, g),$$
$$\text{Min}(X_{M-1}^{-N+1}, X_{M-1}^{-N+2}, \ldots, X_{M-1}^{0}, X_{M-1}^{1}, g),$$

$$\text{Min}(X_{M-1}^{0}, X_{M-1}^{1}, \ldots, X_{M-1}^{N-1}, X_{M-1}^{N}, g),$$
$$\text{Min}(X_{M+1}^{-N+1}, X_{M+1}^{-N+2}, \ldots, X_{M+1}^{0}, X_{M+1}^{1}, g),$$
$$\text{Min}(X_{M+1}^{0}, X_{M+1}^{1}, \ldots, X_{M+1}^{N-1}, X_{M+1}^{N}, g),$$

$$\text{Min}(X_{M+1}^{-1}, X_{M+1}^{0}, \ldots, X_{M+1}^{N-1}, X_{M+1}^{N-1}, g)$$
$$\text{Min}(X_{M+1}^{0}, X_{M+1}^{1}, \ldots, X_{M+1}^{N-1}, X_{M+1}^{N}, g)\} +$$
$$0.5 \times \text{Min}\{\text{Max}(X_{M-1}^{-N}, X_{M-1}^{-N+1}, \ldots, X_{M-1}^{-1}, X_{M-1}^{0}, g),$$
$$\text{Max}(X_{M-1}^{-N+1}, X_{M-1}^{-N+2}, \ldots, X_{M-1}^{0}, X_{M-1}^{1}, g),$$

$$\text{Max}(X_{M-1}^{0}, X_{M-1}^{1}, \ldots, X_{M-1}^{N-1}, X_{M-1}^{N}, g),$$
$$\text{Max}(X_{M+1}^{-N+1}, X_{M+1}^{-N+2}, \ldots, X_{M+1}^{0}, X_{M+1}^{1}, g),$$
$$\text{Max}(X_{M+1}^{0}, X_{M+1}^{1}, \ldots, X_{M+1}^{N-1}, X_{M+1}^{N}, g),$$

$$Max(X_{M+1}^{-1}, X_{M+1}^{0}, \ldots, X_{M+1}^{N-2}, X_{M+1}^{N-1}, g),$$
$$\text{Max}(X_{M+1}^{0}, X_{M+1}^{1}, \ldots, X_{M+1}^{N-1}, X_{M+1}^{N}, g)\}$$

Figure 23:
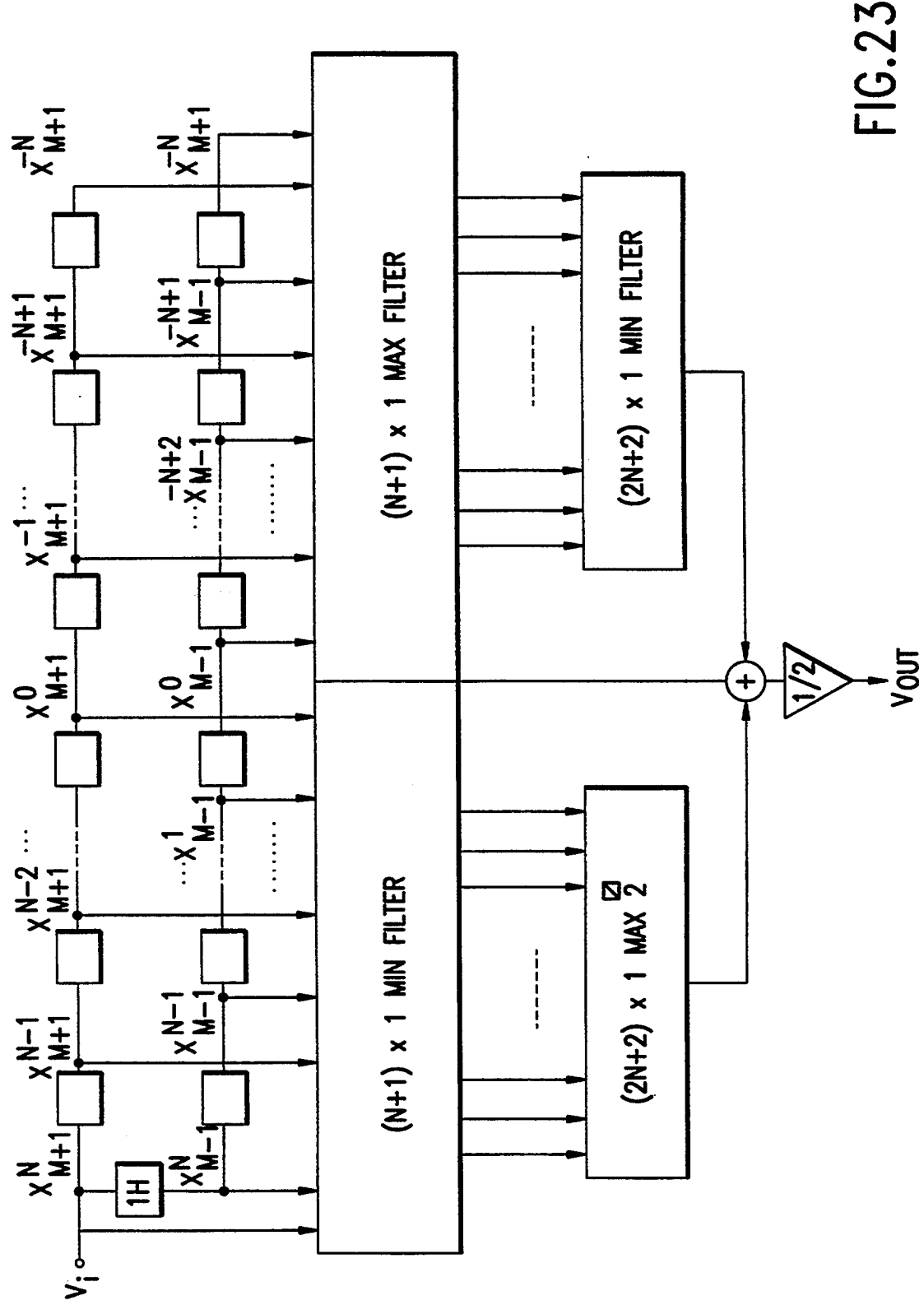
FIG. 23 is a circuit diagram of expression 3.
Figure 24:
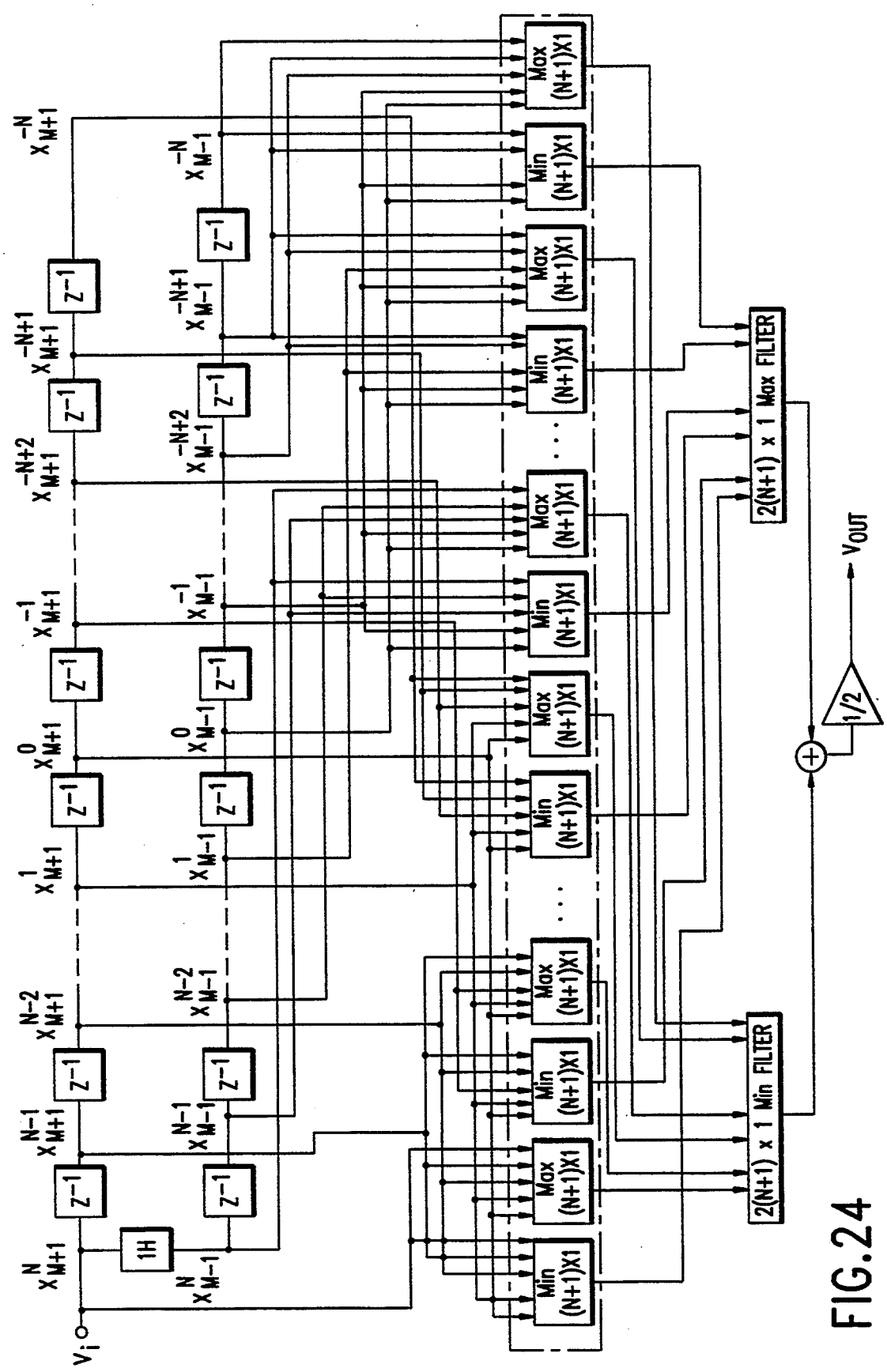
FIG. 24 is a detailed circuit diagram of FIG. 23.
Figure 25:
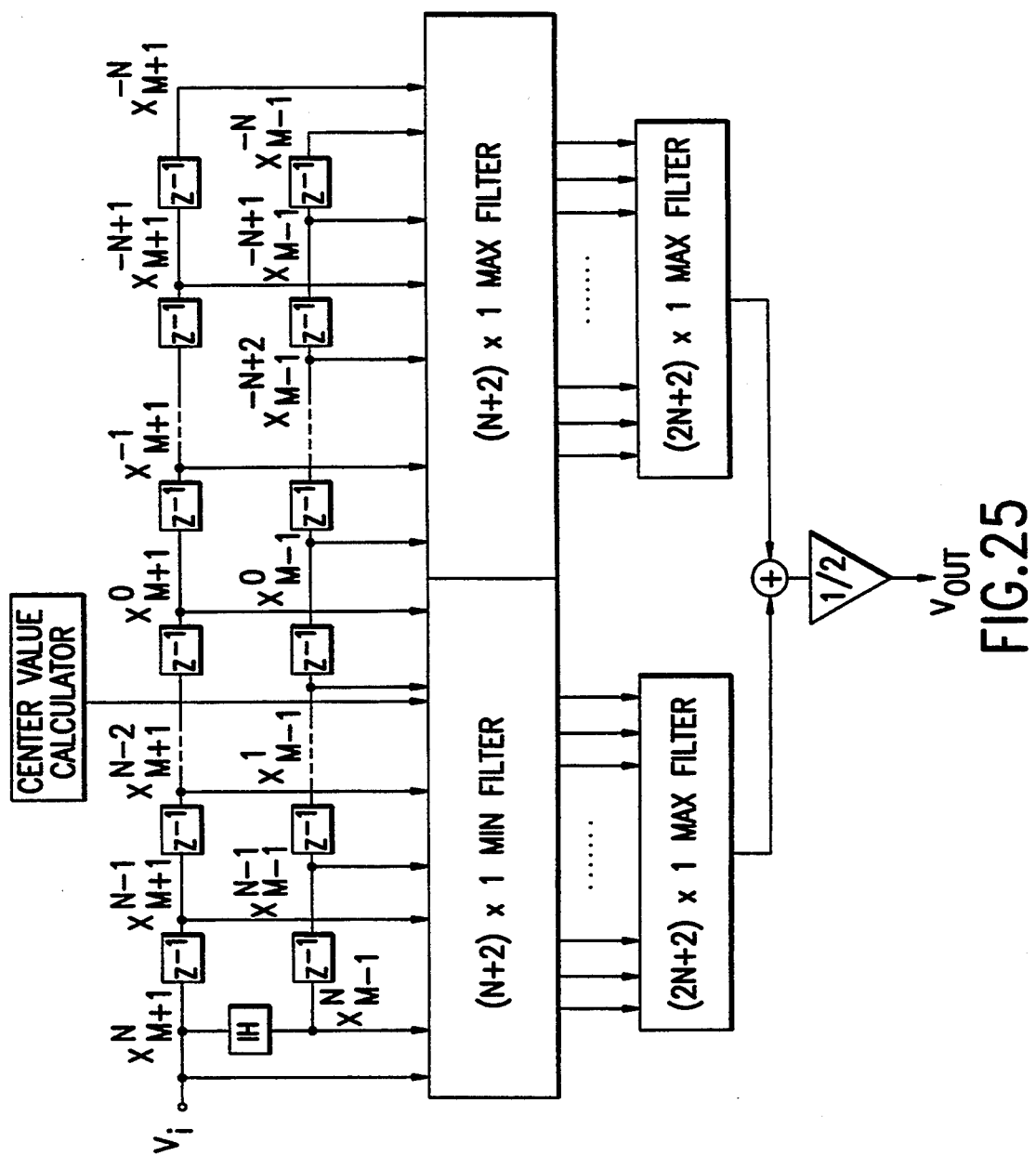
FIG. 25 is a circuit diagram of expression 4.
Figure 26:
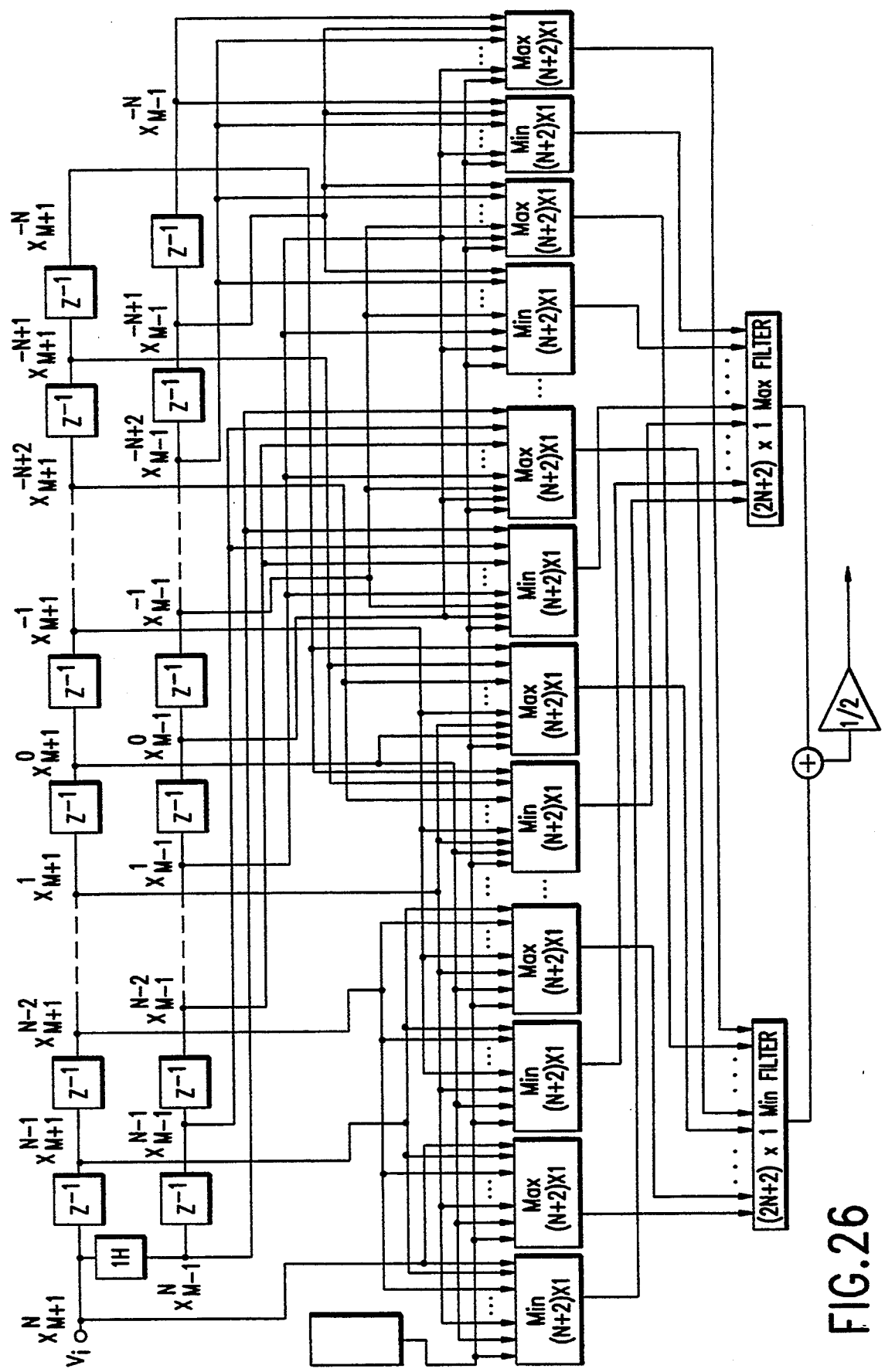

FIG. 23 is a block diagram in accordance with the expression (3), and FIG. 24 is a detailed circuit diagram of FIG. 23. FIG. 25 is a block diagram in accordance with the expression (4), and FIG. 26 is a detailed circuit diagram of FIG. 25.

In accodance with the present invention, it can be utilized for other picture process(for instance, recognition, enhancement, predictive coding, image compression) by utilizing a method for judging the edge pattern, and it is applicable for TV signal process such as an enhancement, Y/C separation and the like by using the infinite impulse response IIR filter maintaining a consistency of control signal, and an edge restoration becomes possible by using a pseudomedian filter and an edge judging signal.

As described above, in accordance with the present invention, scanning line is interpolated by using control signal for judging an edge pattern changing to horizontal, vertical and diagonal directions, so that, a shimmering generated in the intra-field interpolation system or the inter-field interpolation system, a step edge phenomenon and a remarkable picture quality reducing phenomenon by an incongruous interpolation, and various flicker phenomenon due to generation of aliasing when using a median filter, become possible to prevent.

And, only one line memory and four sample memory are used whereby cost is decreased, and a consistency of judging signal is given upon computing the sample value in accordance with the edge pattern whereby a subjective picture quality of entire picture is improved, and a sample value in accordance with the edge pattern and peripheral sample of position to be interpolated are utilized, therefore it has an effect being strong against noise. Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A scanning line converting method for a video signal having vertical, horizontal and diagonal components and an edge pattern used in a television receiver of an interlaced scanning system, said scanning line converting method comprising the steps of:
    determining a sample value of a pixel having a peripheral pixel component and positioned between upper and lower scanning lines responsive to the horizontal, vertical and diagonal components and the edge pattern of the video signal;
    determining a center value of the sample value performed by a two dimensional linear pseudomedian filtering operation responsive to said peripheral pixel component and the upper and lower scanning lines, and outputting a computed signal;
    2/1 time compressing respectively said computed signal and said video signal into respective computed and video time compressed signals; and
    selectively switching said computed and video time compressed signals thereby interpolating the scanning line.

2. A scanning line converting method for a video signal as defined in claim 1, wherein said peripheral pixel component is $(2N+1)(N=1,2,3 \ldots)$ pixel component of pixels existing at upper and lower scanning lines of said pixel to be interpolated.

3. A scanning line converting method for a video signal as defined in claim 1, wherein said center value determining step includes the steps of:
    generating a control signal in accordance with an edge pattern of vertical, horizontal, and diagonal directions by combining said peripheral pixel components; and
    selecting one of average values of vertical average value, horizontal average value and diagonal average value in accordance with said control signal thereby setting said center value by said linear pseudomedian filtering operation.

4. A scanning line converting method for a video signal as defined in claim 1, wherein said peripheral pixel component is a pixel component of said horizontal direction wherein said horizontal average value is set to said center value.

5. A scanning line converting method for a video signal as defined in claim 3, wherein said control signal generating step includes the steps of:
    judging when said center value exceeds a predetermined threshold, wherein the difference between said upper scanning line components having difference signals and said lower scanning line components having difference signals are interpolated; and
    judging a diagonal edge pattern in the event that said value being more than said predetermined threshold is one, a horizontal edge pattern in the event that said value is zero, and a vertical edge pattern in the event that said value is more than two.

6. A canning line converting method for a video signal defined in claim 5, wherein said difference signals are made as the following: $D10 = X-1(n-1) - X-1(n)$, $D11 = X-1(n) - X-1(n+1)$, $D12 = X+1(n-1) - X+1(n)$, $D13 = X+1(n) - X+1(n+1)$, $D14 = X-1(n) - X+1(n)$ wherein, X represents a scanning line, and n is pixel.

7. A scanning line converting method for a video signal as defined in claim 3, wherein said center value setting step further comprises a step for creating a filtering signal by IIR filtering the edge pattern signal of said diagonal direction; then multiplying said filtering signal to sum of components of diagonal direction and multiplying said filtering signal to sum of vertical components and setting a value added the multiplied two values as a center value.

8. A scanning line converting method for a video signal as defined in claim 1, wherein said two dimensional pseudomedian filtering operation has an expression as below as six pixel components existing at upper and lower scanning lines of a pixel to be interpolated:

$$PMED\{a,b,c,g,d,e,f\} = 0.5 \times \text{Min}\{\text{Max}(a,b,g), \text{Max}(b,c,g), \text{Max}(d,e,f), \text{Max}(e,f,g)\} + 0.5 \times \text{Max}\{\text{Min}(a,b,g), \text{Min}(b,c,g), \text{Min}(d,e,f), \text{Min}(e,f,g)\}$$

wherein, a,b,c represent the pixel components existing at the upper scanning line, d,e,f are the pixel components existing at the lower scanning line, and g is the center value.

9. A scanning line converting method for a video signal as defined in claim 1, wherein said two dimensional pseudomedian filtering operation step includes an infinite impulse response IIR filtering step.

10. The scanning line converting method of claim 1 wherein said computing step includes weighing the pixels nearest to said pixel to be interpolated higher than other pixels.

11. A scanning line converter for a video signal comprising:
    means for determining a sample value of a pixel having a peripheral pixel component and positioned between upper and lower scanning lines response to the horizontal, vertical and diagonal components and the edge pattern of the video signal;

means for determining a center value of the sample value performed by a two dimensional linear pseudomedian filtering operation responsive to said peripheral pixel component and the upper and lower scanning lines, and outputting a computed signal;

means for 2/1 time compressing respectively said computed signal and said video signal into respective computed and video time compressed signals; and means for selectively switching said 2/1 computed and video time compressed signals thereby interpolating the scanning line.

12. A scanning line converter for a video signal as defined in claim 11, wherein said center value determining means includes:

means for generating a control signal in accordance with an edge pattern of vertical, horizontal, and diagonal directions by combining said peripheral pixel components; and means for selecting one of average values of a vertical average value, horizontal average value, and diagonal average value in accordance with said control signal whereby setting to a center value of the pseudomedian filtering operation.

13. A scanning line converter for a video signal as defined in claim 12, wherein said control signal generating means includes:

means for judging when said center value exceeds a predetermined threshold, wherein the difference between said upper scanning line components having difference signals and said lower scanning line components having difference signals are interpolated; and means for judging a diagonal edge pattern in the event that a said value being more than said predetermined threshold is one, a horizontal edge pattern in the event that said value is zero, and a vertical edge pattern in the event that said value is more than two.

14. A scanning line converter of television receiver comprising:

means for determining an average pixel value in accordance with the movement of video signal in a video signal of interlaced scanning system;

means for computing with two dimensional pseudomedian filtering the average pixel value of a peripheral pixel component existing between upper and lower scanning lines of said video signal;

means for 2/1 time compressing respectively said computed pixel value signal and said video signal; and means for selectively switching said 2/1 time compressed signals, thereby interpolating the scanning line.

15. Scanning line converter of television receiver as defined in claim 14, wherein said pixel value determining step includes:

means for detecting a movement of the video signal; and means for setting a pixel corresponding to a position of said pixel to be interpolated at a pervious field of a field existing with pixel to be interpolated, when movement of said video signal is not detected.

16. Scanning line converter of television receiver as defined in claim 14, wherein said average pixel value determining means includes:

means for detecting a movement of the video signal; and means for setting an average value of upper and lower pixels of a field having a pixel to be interpolated, when a movement of said video signal is detected.

17. A scanning line converting method for a video signal comprising the steps of:

determining an average pixel value in accordance with the movement of said video signal of an interlaced scanning system;

computing with two dimensional pseudomedian filtering the average pixel value of pixel values of a peripheral pixel component, said peripheral pixel component existing between upper and lower scanning lines of said video signal;

2/1 time compressing respectively said computed pixel value signal and said video signal; and selectively switching said 2/1 time compressed signals, thereby interpolating said scanning line.

18. The scanning line converting method of claim 17, wherein said average pixel value determining step further includes the steps of:

detecting a movement of the video signal;

setting a pixel corresponding to a position of said pixel to be interpolated at a previous field of a field of existing with said pixel to be interpolated when movement of said video signal is not detected.

19. The scanning line converting method of claim 18 wherein said average pixel value determining step further includes:

detecting a movement of said video signal; and setting an average value of upper and lower pixels in a field having a pixel to be interpolated when a movement of said video signal is detected.

20. The scanning line converting method of claim 19 wherein said computing step includes weighing the pixels nearest to said pixel to be interpolated higher than other pixels.

21. The scanning line converting method of claim 19, wherein said average pixel value is determined by the following expression:

pixel i = PMED(a,b,c,d,e,f)
= 0.5 × MAX[MIN(a,b), MIN(b,c), MIN(d,e), MIN(e,f)]
= 0.5 × MIN[MAX(a,b), MAX(b,c), MAX(d,e), MAX(e,f)].

* * * * *